US012592654B2

(12) United States Patent
Tao et al.

(10) Patent No.: US 12,592,654 B2

(45) Date of Patent: Mar. 31, 2026

(54) MOISTURE ENABLED ELECTRIC POWER GENERATION MATERIALS AND DEVICE

(71) Applicant: THE HONG KONG POLYTECHNIC UNIVERSITY, Hong Kong (CN)

(72) Inventors: Xiao-ming Tao, Hong Kong (CN); Su Yang, Hong Kong (CN)

(73) Assignee: THE HONG KONG POLYTECHNIC UNIVERSITY, Hong Kong (CN)

(*) Notice: Subject to any disclaimer, the term of this patent is extended or adjusted under 35 U.S.C. 154(b) by 966 days.

(21) Appl. No.: 17/806,108

(22) Filed: Jun. 9, 2022

(65) Prior Publication Data

US 2022/0407436 A1 Dec. 22, 2022

Related U.S. Application Data

(60) Provisional application No. 63/202,407, filed on Jun. 10, 2021.

(51) Int. Cl.

| | |
|---|---|
| ***H02N 3/00*** | (2006.01) |
| ***C08J 3/075*** | (2006.01) |
| ***C08L 29/04*** | (2006.01) |

(52) U.S. Cl.

CPC ................ *H02N 3/00* (2013.01); *C08J 3/075* (2013.01); *C08L 29/04* (2013.01); *C08J 2329/04* (2013.01)

(58) Field of Classification Search

CPC .... C08J 3/075; C08J 2329/04; C08J 2429/04; C08L 29/04; C09D 129/04; C09D 7/61; H01M 8/08; C08K 3/16; C08K 5/09

See application file for complete search history.

(56) References Cited

U.S. PATENT DOCUMENTS

2019/0044052 A1* 2/2019 Zelka .................... A61H 23/02

FOREIGN PATENT DOCUMENTS

| | | | |
|---|---|---|---|
| CN | 109546890 | A | 3/2019 |
| CN | 111641353 | A | 9/2020 |
| WO | 2020006942 | A1 | 1/2020 |
| WO | 202069523 | A1 | 4/2020 |
| WO | 2020147443 | A1 | 7/2020 |

OTHER PUBLICATIONS

"An efficient polymer moist-electric generator", Xu et al., Energy Environ. Sci., 2019, 12, 972-978. (Year: 2019).*

Technical Datasheet of 3M VHN Tapes, 2015 (Year: 2015).*

Anti-freezing and moisturizing conductive hydrogels for strain sensing and moist-electric generation applications, Peng He et. al., Journal of Materials Chemistry A, 2020,08.3109-3118.

Yang et. al., Ionic Hydrogel for Efficient and Scalable Moisture-Electric Generation, Advanced Materials, 2022.

* cited by examiner

*Primary Examiner* — Aiqun Li

(74) *Attorney, Agent, or Firm* — S&F/WEHRW

(57) ABSTRACT

An ionic hydrogel moisture-electric generator including a thin film comprising a first surface and a second surface opposite to the first surface; a first electrode electrically connected to the first surface of the thin film; a second electrode electrically connected to the second surface of the thin film; and a moisture impermeable barrier film disposed on the second surface of the thin film, wherein the thin film comprises a hydrogel comprising at least one hydrophilic polymer, an ionic species, and a solvent; the ionic species is an acid or a salt; and the solvent includes a hygroscopic liquid.

18 Claims, 26 Drawing Sheets

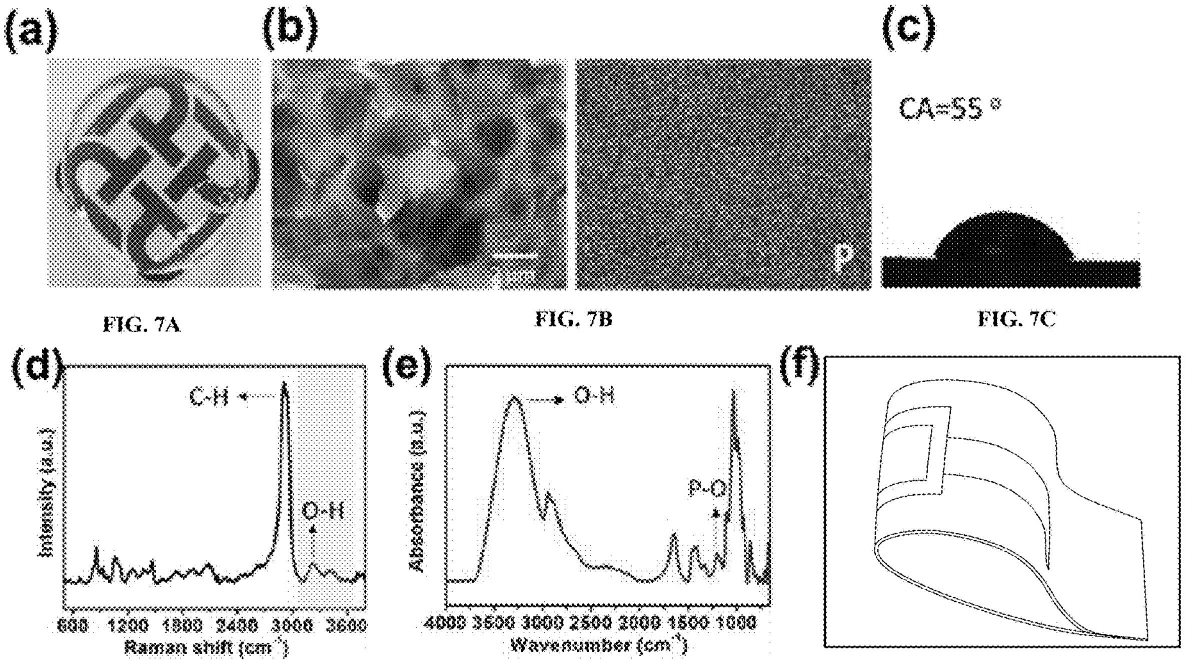
FIG. 7A
FIG. 7B
FIG. 7C
FIG. 7D
FIG. 7E
FIG. 7F
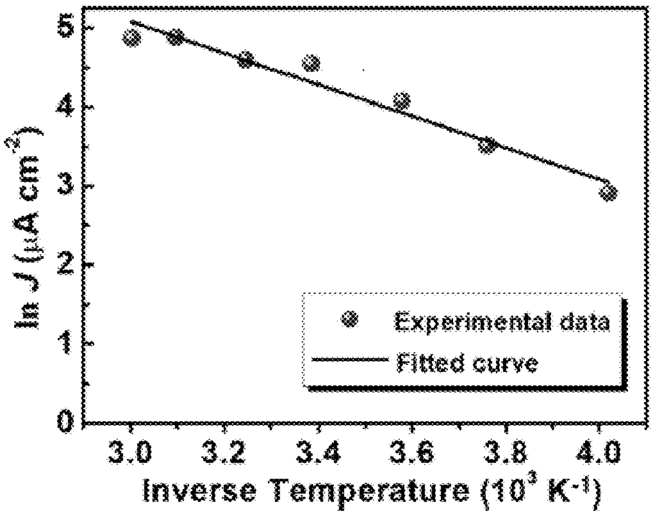
FIG. 8

MOISTURE ENABLED ELECTRIC POWER GENERATION MATERIALS AND DEVICE

CROSS-REFERENCE TO RELATED APPLICATIONS

The present application claims priority from U.S. Provisional Patent Application No. 63/202,407, filed on Jun. 10, 2021, which is hereby incorporated by reference in its entirety.

TECHNICAL FIELD

The present disclosure relates to the field of moisture-enabled power generation materials. More particularly, the present disclosure relates to a multifunctional moisture-absorbing power generation material and related power generation device.

BACKGROUND

Moisture enabled electricity generation enables the direct transfer of the chemical energy in moisture to electricity. This approach represents a new method of harvesting energy different from traditional energy generation hydroelectric energy generation.

Water vapor is ubiquitous and is present in the most environments including under very arid conditions on Earth. Due to water's higher saturated vapor pressure than its partial pressure, liquid water vaporizes spontaneously in air. Such a unique property poses great potential to harvest energy continuously from environmental moisture. Moisture enabled electricity generation provides a versatile strategy to satisfy increasing energy demands and is capable of supporting self-sustaining systems. Nevertheless, existing methods of moisture enabled electricity generation heavily rely on graphene or carbon-based materials, which are costly and cumbersome to prepare. In addition to that, low power density and intermittent current density limit their further practical application.

WO2020006942A1 discloses a method for preparing heterostructured porous graphene oxide film, graphene film and electric generator thereof. However, the voltage of heterostructured porous graphene film is less than 0.5 V and the peak output power density is only 2.02 $\mu W\ cm^{-2}$.

WO2020147443A1 discloses a moisture power generation method utilizing different polymer films with an intermittent voltage (0.6 V) and transient current (2 $\mu A$), which limits practical application.

WO2020069523A1 discloses electric power generation from ambient humidity using protein nanowires. The electric power generator generates continuous electric power in the ambient environment, producing sustained voltage of, for example, around 0.5 V across a 7 $\mu m$ film thickness with a current density of around 17 $A/cm^2$. However, the short-circuit current ($I_{SC}$) of around −250 nA is low.

Up to now, most of MEGs still suffer from an intermittent mode output signals or an inferior current density in the range of nano-amperes in a continuous mode or micro-amperes in an intermittent mode. With regard to normal electronic appliances, flexible and efficient MEGs with an easy scale-up capability are still challenging to meet the threshold requirement in a few to tens of volts. Therefore, it is highly desirable to develop direct-circuit (DC), high-performance, stable, and scalable MEGs toward next-generation energy supply.

There is thus a need for improved methods and devices for improved moisture enabled electricity generation.

SUMMARY

Provided herein is an ionic hydrogel moisture-electric generator (IHMEG) comprising a hydrophilic polymeric network, exemplified by poly(vinyl alcohol) (PVA)-phytic acid (PA), and hygroscopic medium, exemplified by glycerin. On one hand, the combination of hydrophilic PVA-PA network and hygroscopic glycerol enables IHMEG a high-capability of moisture sorption. On the other hand, PA with six esterified phosphoric acids allows the IHMEG to achieve massive proton dissociation and migration by sufficient hydration effect. This device possesses continuous voltage and current output with the atmospheric humidity stimulation. The material is fabricated with a water-absorbing polymer, an acid or salt readily protonated/dissociated as well as an organic solvent with self-maintaining water feature. The sustained power generation roots in moisture-absorbing/maintaining and accompanied ionic clusters diffusion in the thin film, therefore, a steady DC voltage and DC current are produced for driving electronics.

In a first aspect, provided herein is an ionic hydrogel moisture-electric generator (IHMEG) comprising:

a thin film comprising a first surface and a second surface opposite to the first surface;

a first external electrode electrically connected to the first surface of the thin film;

a second electrode electrically connected to the second surface of the thin film; and a moisture impermeable barrier film disposed on the second surface of the thin film, wherein the thin film comprises a hydrogel comprising at least one hydrophilic polymer, an ionic species, and a solvent;

the ionic species is an acid, a salt, or an ionic polymer; and the solvent comprises a hygroscopic liquid.

In certain embodiments, the first surface of the thin film is at least partially exposed to an ambient environment with relative humidity of at least 10%.

In certain embodiments, the at least one hydrophilic polymer is selected from the group consisting of polyvinyl alcohol, polyacrylic acid, sodium polyacrylic acid, sodium alginate, calcium alginate, polyacrylamide, cross-linked carboxymethyl cellulose, cross-linked poly(ethylene oxide), starch graft polyacrylonitrile copolymer, poly(3,4-ethylenedioxythiophene)-poly(styrenesulfonate) (PEDOT:PSS), polydiallyl dimethylammonium chloride, and copolymers, or a combination thereof.

In certain embodiments, the at least one hydrophilic polymer is polyvinyl alcohol.

In certain embodiments, the acid is sulfuric acid, hydrochloric acid, phosphoric acid, nitric acid, boric acid, hydrobromic acid, perchloric acid, hydroiodic acid, phytic acid, citric acid, acetic acid, oxalic acid, aminosulfonic acid, glycolic acid, citric acid, ethylene diaminetra acetic acid, phosphotungstic acid, or a combination thereof.

In certain embodiments, the salt is at least one of a potassium, sodium, ammonium, or calcium salt of a nitrate, chloride, bromide, iodide, or dihydric phosphate, sodium acetate, pyridinium acetate, sodium methoxide, or sodium ethoxide.

In certain embodiments, the acid is phytic acid.

In certain embodiments, the ionic polymer is selected from the group consisting of: an ionic polymer represented by the structure:

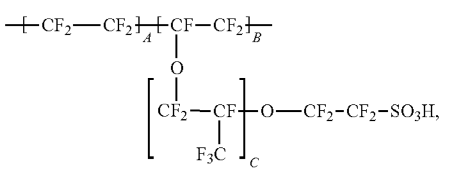

wherein A is 5 to 15, B is 800 to 1,200; and C is 1 to 100; and an ionic polymer represented by the structure:

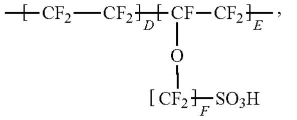

wherein D is 5 to 15, E is 800 to 1,200; and F is 1 to 5.

In certain embodiments, the hygroscopic liquid is ethylene glycol, diethylene glycol, 2-(2-ethoxyethoxy)ethanol, a polyol, glycerol, propylene glycol, dipropylene glycol, 1,2 butanediol, 1,3 butanediol, 1,4 butanediol, sorbitol, polyethylene glycol, polypropylene glycol, or a combination thereof.

In certain embodiments, the solvent further comprises water and the weight ratio of the hygroscopic liquid to water is 1:9 to 9:1, respectively.

In certain embodiments, hygroscopic liquid is glycerol.

In certain embodiments, the moisture impermeable barrier film comprises a polyester, a polyimide, polyvinyl film, polypropylene, polytetrafluoroethylene, polytetrafluoroethylene, polyvinylidene fluoride, polyacrylonitrile, or a copolymer or mixture thereof.

In certain embodiments, each of the first electrode and second electrode independently comprise one or more of gold, platinum, aluminum copper, nickel, silver, titanium, or carbon.

In certain embodiments, the IHMEG comprises:

wherein the at least one hydrophilic polymer is selected from the group consisting of polyvinyl alcohol, polyacrylic acid, sodium polyacrylic acid, sodium alginate, polyacrylamide, cross-linked carboxymethyl cellulose, cross-linked poly(ethylene oxide), starch graft polyacrylonitrile copolymer, and copolymers thereof;

the ionic species is an acid selected from the group consisting of sulfuric acid, hydrochloric acid, phosphoric acid, nitric acid, boric acid, hydrobromic acid, perchloric acid, hydroiodic acid, phytic acid, citric acid, acetic acid, oxalic acid, aminosulfonic acid, glycolic acid, citric acid, ethylene diaminetra acetic acid, and combinations thereof; or the ionic species is at least one of a potassium, sodium, ammonium, or calcium salt of a nitrate, chloride, bromide, iodide, or dihydric phosphate, sodium acetate, pyridinium acetate, sodium methoxide, or sodium ethoxide; or the ionic species is at least one of Nafion or Flemion; and the solvent comprises water and a hygroscopic liquid, wherein the hygroscopic liquid is ethylene glycol, diethylene glycol, 2-(2-ethoxyethoxy)ethanol, a polyol, glycerol, propylene glycol, dipropylene glycol, 1,2 butanediol, 1,3 butanediol, 1,4 butanediol, sorbitol, polyethylene glycol, polypropylene glycol, or a combination thereof.

In certain embodiments, the IHMEG comprises:

wherein the thin film comprises a hydrogel comprising glycerol, phytic acid, and a solvent comprising water and glycerol.

In certain embodiments, glycerol and water are present in the solvent at a ratio of 1:9 to 9:1, respectively.

In certain embodiments, phytic acid is present in the hydrogel at a concentration of 12-48 wt % relative to the weight of ionic species+at least one hydrophilic polymer+solvent.

In certain embodiments, the thin film has a desired thickness in the range of 0.1-2.5 mm.

In certain embodiments, the IHMEG has an open-circuit voltage of 0.22-0.88 V, a short-circuit current of 82 nA-64 μA in a range of 10% -85% relative humidity, respectively and the IHMEG continuously works in Direct-Current mode for over 1,000 hours in open environment.

In a second aspect, provided herein is a method of generating electrical power, the method comprises at least partially exposing the first surface of the IHMEG of the first aspect to an ambient environment having relative humidity of at least 10% thereby forming a moisture gradient in the thin film and generating electrical power in the IHMEG.

In certain embodiments, the ambient environment has a temperature between −24-60° C.

In a third aspect, provided herein is a plurality of IHMEG of the first aspect, wherein each IHMEG of the plurality of IHMEG is independently electrically connected in parallel or in series.

In certain embodiments, the thin film has a thickness in the range of 0.1-2.5 mm. In certain embodiments, the atmospheric relative humidity is in the range of 10% to 90%.

The IHMEG can be stacked in a multiple layer fashion where the electric connections are done by the tracks through the thickness direction and each layer is separated by a porous spacer fabric made from hydrophobic dielectric fibers like polyester, polyamide, polyolefin, polylactic acid, polyhydroxybutyrate, etc.

BRIEF DESCRIPTION OF THE DRAWINGS

The above and other objects and features of the present disclosure will become apparent from the following description of the disclosure, when taken in conjunction with the accompanying drawings.

FIG. 7 depicts A) The photo of the hydrogel with good transparent appearance. B) The cross-sectional SEM image of dehydrated hydrogel as well as the corresponding EDS mapping of P element. C) The contact angle of the hydrogel, showing its hydrophilic nature. D) The Raman spectrum of the hydrogel surface, in which the arrows direct to integrated intensities of characteristic regions of C—H and O—H bonds, respectively. The grey region (O—H bonds) is used to track the water sorption process. E) The FTIR spectrum of hydrogel, 1200 $cm^{-1}$ represent the peak of P—O bond. F) The picture of one single IHMEG device.

FIG. 8 depicts the natural logarithm of the current density (J) as a function of temperature corresponding to the result of FIG. 2*e*. The test condition is at 80% RH and 22° C., unless otherwise stated.

DETAILED DESCRIPTION

Definitions

Figure 1:
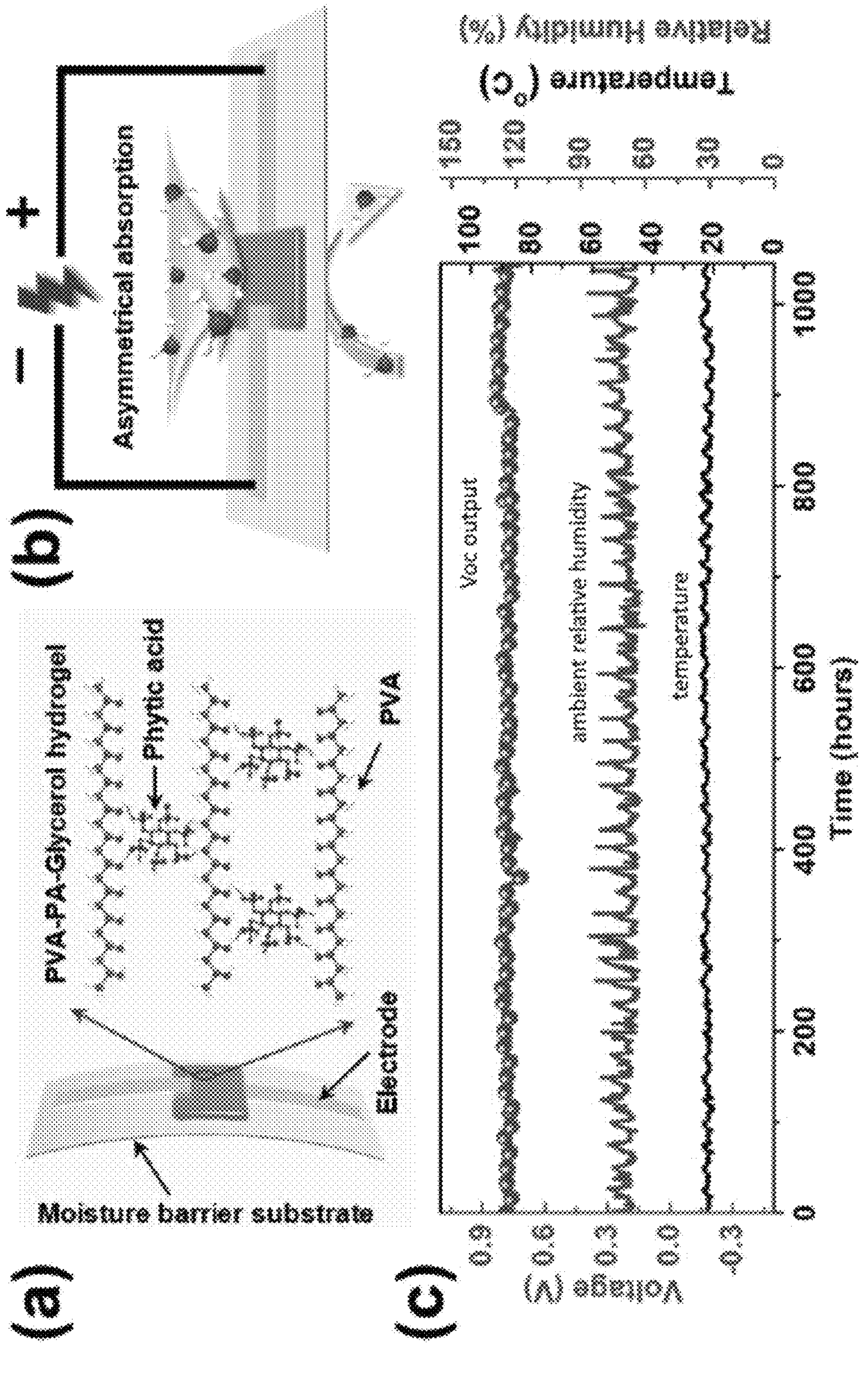
FIG. 1 depicts a schematic and electric output characteristics of IHMEG. A) The structure of one single IHMEG device with asymmetric-moisture penetration layers. The material consists of PA-gelated hydrogel. B) The schematic diagram of the asymmetric moisture stimulus-induced potential in IHMEG. C) The continuous DC $V_{oc}$ output of an IHMEG device over time under open ambient environment. The ambient relative humidity and temperature were synchronously recorded.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±9%, ±8%, ±7%, ±6%, ±5%, ±4%, ±3%, ±2%, ±1%, ±0.75%, ±0.5%, ±0.25%, ±0.1%, or ±0% variation from the nominal value unless otherwise indicated or inferred.

Provided herein is a ionic hydrogel moisture-electric generator (IHMEG) comprising: a thin film comprising a first surface and a second surface opposite to the first surface; a first electrode electrically connected to the first surface of the thin film; a second electrode electrically connected to the second surface of the thin film; and a moisture impermeable barrier film disposed on the second surface of the thin film, wherein the thin film comprises a hydrogel comprising at least one hydrophilic polymer, an ionic species, and a solvent; the ionic species is an acid, a salt, or an ionic polymer; and the solvent comprises a hygroscopic liquid.

When the IHMEG is operated, the first surface of the thin film is at least partially exposed to an ambient environment with relative humidity of at least 10%, at least 20%, at least 30%, at least 40%, at least 50%, at least 60%, at least 70%, at least 80%, or at least 90%. In certain embodiments, the first surface of the thin film is at least partially exposed to an ambient environment with relative humidity of 10-90%, 10-80%, 10-70%, 10-60%, 10-50%, 10-40%, 10-30%, 10-20%, 20-90%, 30-90%, 40-90%, 50-90%, 60-90%, 70-90%, or 80-90%.

Upon exposure of the IHMEG to an ambient environment comprising at 10% relative humidity, a moisture gradient is created and maintained in the thin film.

In certain embodiments, the at least one hydrophilic polymer is selected from the group consisting of polyvinyl alcohol, polyacrylic acid, sodium polyacrylic acid, sodium alginate, calcium alginate, polyacrylamide, cross-linked carboxymethyl cellulose, cross-linked poly(ethylene oxide), starch graft polyacrylonitrile copolymer, poly(3,4-ethylenedioxythiophene)-poly(styrenesulfonate) (PEDOT:PSS), polydiallyl dimethylammonium chloride, copolymers thereof, and grafts thereof In certain embodiments, the at least one hydrophilic polymer is polyvinyl alcohol.

In the examples below, the hydrogel comprises one hydrophilic polymer. However, the hydrogen can comprise more than one hydrophilic polymer, e.g., 2, 3, 4, 5, 6, 7, 8 or more different types of hydrophilic polymers.

The concentration of the at least one hydrophilic polymer in the solvent should be sufficient to form a hydrogel in the presence of the ionic species. The necessary concentration of the at least one hydrophilic polymer can vary based on the properties of the at least one hydrophilic polymer, the ionic species, and the solvent. The selection of the appropriate concentration of the at least one hydrophilic polymer in the solvent is well within the skill of a person of ordinary skill in the art. In certain embodiments, the concentration of the at least one hydrophilic polymer in the solvent is between 5-50 wt %, 5-45 wt %, 5-40 wt %, 10-40 wt %, 5-35 wt %, 5-30 wt %, 10-30 wt %, 5-25 wt %, 5-20 wt %, 10-20 wt %, or 10-15 wt %. In certain embodiments, the concentration of the at least one hydrophilic polymer in the solvent is about 13.8 wt %.

The type of acid is not particularly limited. The present disclosure contemplates the use of any acid know to those of ordinary skill in the art. In certain embodiments, the acid is an inorganic acids or an organic acid. The acid can have a pKa ranging from −3 to 3, −3 to 2, −2 to 2, −1 to 2, or 0 to 1.5. In certain embodiments, the acid has a pKa of about 1.5. Exemplary acids include, but are not limited to, sulfuric acid, hydrochloric acid, phosphoric acid, nitric acid, boric acid, hydrobromic acid, perchloric acid, hydroiodic acid, phytic acid, citric acid, acetic acid, oxalic acid, aminosulfonic acid, glycolic acid, citric acid, ethylene diaminetra acetic acid, phosphotungstic acid, or a combination thereof In certain embodiments, the acid is phytic acid.

The salt can be at least one of a potassium, sodium, ammonium, or calcium salt of a nitrate, chloride, bromide, iodide, dihydric phosphate, acetate, methoxide, or ethoxide. In certain embodiments, the salt is. sodium acetate, pyridinium acetate, sodium methoxide, or sodium ethoxide.

The ionic polymer can be a fluorinated alkyl ether sulfonic acid polymer sold under the trademark Nafion™ or Flemion™.

Nafion™ can be represented by the chemical structure:

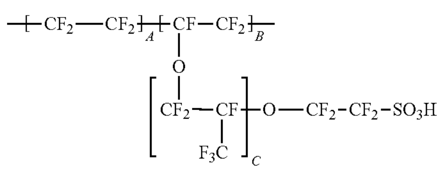

wherein A is about 5 to about 15, B is about 800 to about 1,200; and C is 1-100.

Flemion™ can be represented by the chemical structure:

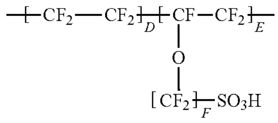

wherein D is about 5 to about 15, E is about 800 to about 1,200; and F is 1-5.

The concentration of the ionic species in the hydrogel can be between 5-90 wt % (relative to the weight of ionic species+at least one hydrophilic polymer+solvent). In certain embodiments, the concentration of the ionic species in the hydrogel is between 5-80 wt %, 5-70 wt %, 5-60 wt %, 10-60 wt %, 10-50 wt %, 12-48 wt %, 24-48 wt %, 18-30 wt %, 19-29 wt %, 20-28 wt %, 21-27 wt %, 22-26 wt %, or 23-25 wt % (relative to the weight of ionic species+at least one hydrophilic polymer +solvent). In certain embodiments, the concentration of the ionic species is about 24% (relative to the weight of ionic species+at least one hydrophilic polymer+solvent).

The solvent comprises a hygroscopic liquid. The hydroscopic liquid can be any liquid that is at least partially miscible with water and is hygroscopic. Exemplary hygroscopic liquids include, but are not limited, ethylene glycol, diethylene glycol, 2-(2-ethoxyethoxy)ethanol, a polyol, glycerol, propylene glycol, dipropylene glycol, 1,2 butanediol, 1,3 butanediol, 1,4 butanediol, sorbitol, polyethylene glycol, polypropylene glycol, or a combination thereof In certain embodiments, the hygroscopic liquid is glycerol.

In certain embodiments, the solvent further comprises water. The concentration of the hydroscopic liquid in the solvent can be between 10-90 wt %. In certain embodiments, the concentration of the hydroscopic liquid in the solvent is between 10-80 wt %, 10-70 wt %, 10-60 wt %, 20-60 wt %, 20-50 wt %, 25-45 wt %, or 30-45 wt %. In certain embodiments, the concentration of the hydroscopic liquid in the solvent is about 30%.

The moisture impermeable barrier film can comprise a polyester, a polyimide, polyvinyl film, polypropylene, polytetrafluoroethylene, polytetrafluoroethylene, polyvinylidene fluoride, polyacrylonitrile, or a copolymer or mixture thereof. In certain embodiments, the moisture impermeable barrier film is polyvinylidene fluoride.

The thin film can have a thickness in the range of 0.1-2.5 mm, 0.25 mm to 2.5 mm, 0.5 mm to 2.5 mm, 0.5 mm to 2.0 mm, 0.75 mm to 2.0 mm, 1.0 mm to 2.0 mm, 1.25 mm to 2.0 mm, 1.5 mm to 2.0 mm, 1.75 mm to 2.0 mm, 0.75 mm to 1.75 mm, 1.0 mm to 1.75 mm, 1.0 mm to 1.5 mm, or 1.25 mm to 1.75 mm. In certain embodiments, the thin film has a thickness of about 1.5 mm.

Figure 20:
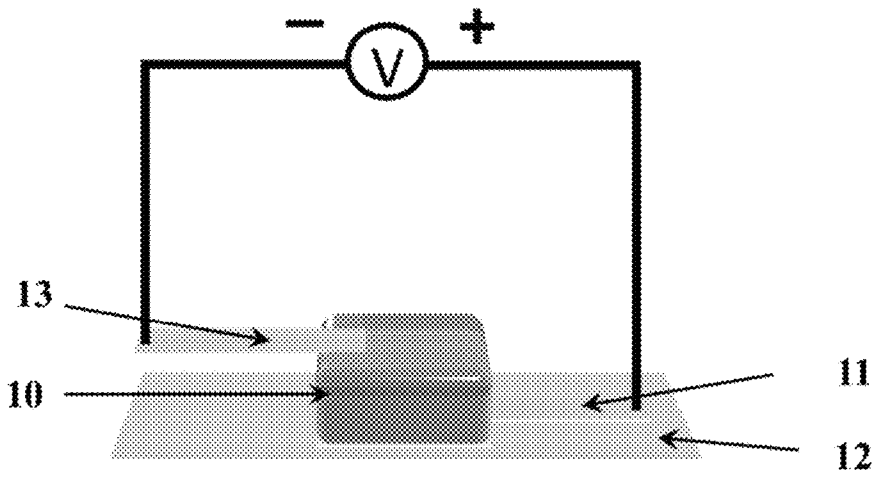
FIG. 20 depicts A) schematic diagram of the fabrication process for the Ni pattern. B) SEM image and EDS mapping of the deposited nickel with "POLYU" pattern. C) The cross-sectional image of Ni layer.

FIG. 20 depicts an exemplary IHMEG configuration according to certain embodiments described herein, comprising a first electrode 13; a second electrode disposed opposite to the first electrode 11; a thin film 10 having a first surface and a second surface disposed between the first electrode 13 and the second electrode 11; first electrode 13 electrically connected to the first surface of the thin film 10; the second electrode electrically connected to the second surface of the thin film 10; a moisture impermeable barrier film 12 disposed on the second surface of the thin film 10.

In certain embodiments, the first electrode 13 is the positive electrode and the second electrode 11 is the negative electrode. In certain embodiments, the first electrode 13 is the negative electrode and the second electrode 11 is the positive electrode.

The negative electrode may be any material having a conductivity that does not cause a chemical change in the thin film, for example, copper, stainless steel, aluminium, nickel, titanium, sintered carbon, or copper or stainless steel of which a surface is treated with carbon, nickel, titanium, silver, or the like, or an aluminium-cadmium alloy. Additional exemplary negative electrodes include, but are not limited to copper foil, copper mesh foil, copper foam sheets, nickel foam sheets, nickel mesh foil, and nickel foil. In some embodiments, the negative electrode may be in any of various forms, including a film, a sheet, a foil, a net, a porous structure, foam, and non-woven fabric.

The positive electrode may be any material having a high conductivity that does not cause a chemical change in the lithium battery, for example, stainless steel, aluminium, nickel, titanium, sintered carbon, or aluminium or stainless steel of which a surface is treated with carbon, nickel, titanium, silver, or the like. In certain embodiments, the positive electrode may have fine irregularities on a surface thereof so as to have enhanced adhesive strength to the positive active material. The positive electrode may be in any of various forms, including a film, a sheet, a foil, a net, a porous structure, foam, and non-woven fabric.

In certain embodiments, the first electrode and second electrode comprise one or more of gold, platinum, aluminum copper, nickel, silver, titanium and carbon.

Figure 18A:
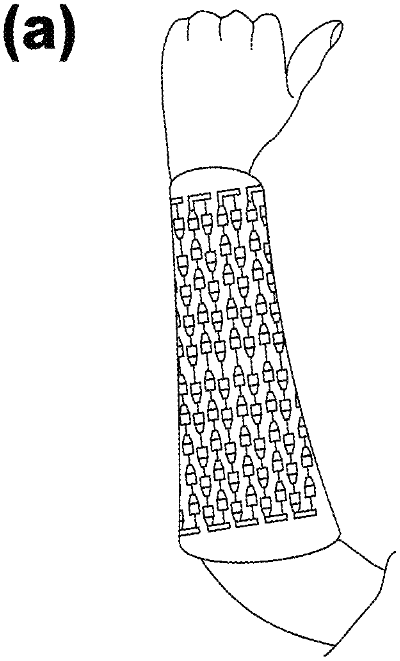
FIG. 18 depicts A) The picture of the serial IHMEG patterned on the textile. B) The picture of the serial IHMEG patterned on PET film.
Figure 18B:
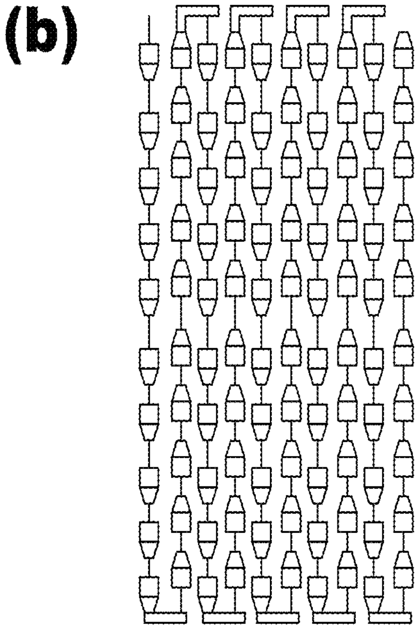

By appropriate selection of a flexible or rigid moisture impermeable barrier film, the flexibility of the IHMEG can be modified. Flexible IHMEG can be used as an electrical power source for smart textiles and wearable electronic systems as illustrated in FIG. 18.

In certain embodiments, at least two IHMEG are electrically connected in series or parallel on a flexible two-dimensional substrate. At least the top surface of the thin film of each power generation device can be partially exposed to the ambient environment.

Figure 2:
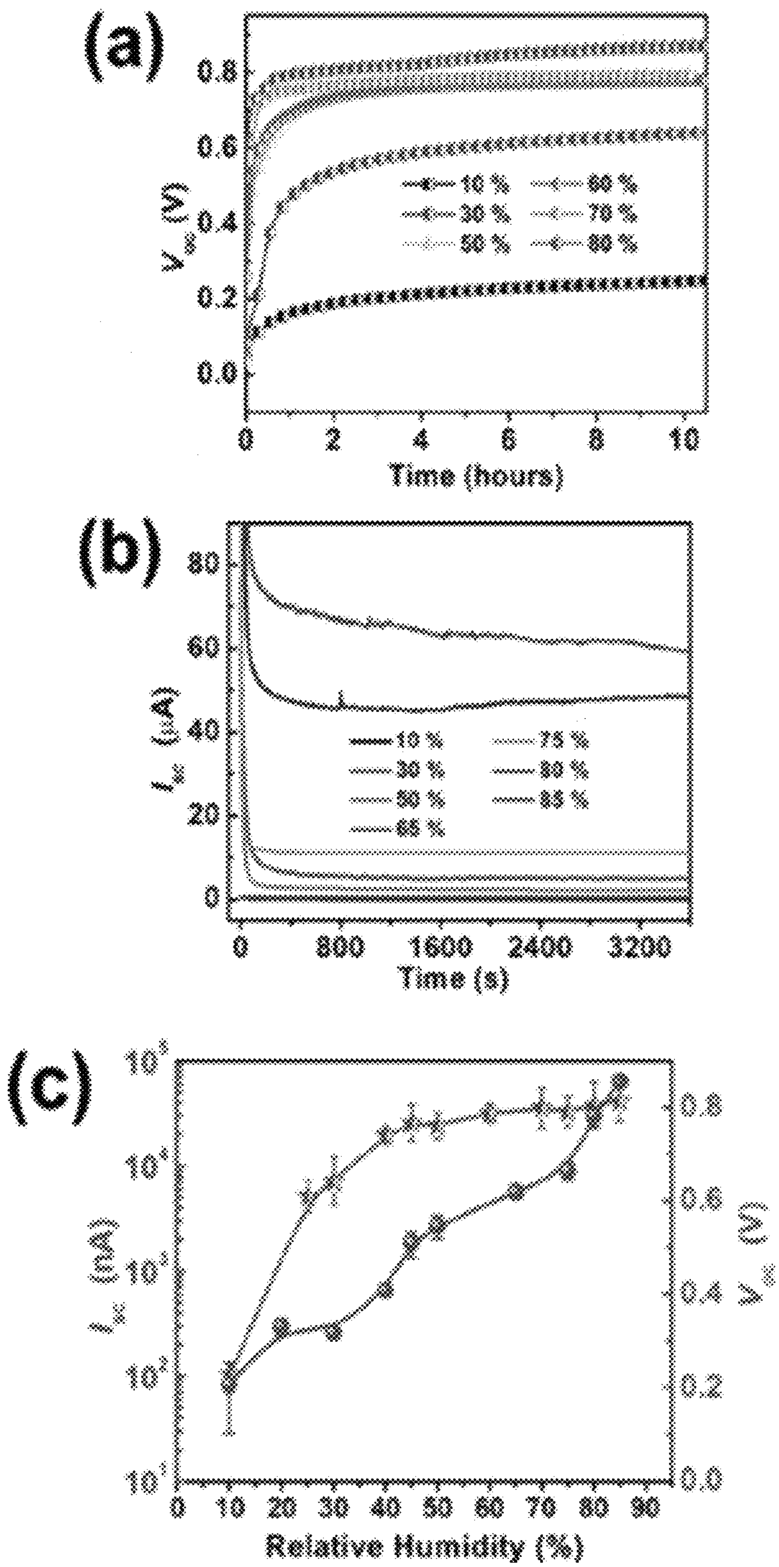
FIG. 2 depicts A) The curves of $V_{oc}$ versus time at different RH conditions at room temperature. B) The curves of $I_{sc}$ versus time at different RH conditions at room temperature. C) The variation of stable $V_{oc}$ and $I_{sc}$ versus RH change from 10% to 85%. Data represent the mean±standard deviation (n=4). D) Variations of I and $V_{oc}$ from a working IHMEG device with a switch and an external load (shown in the inset) in the ambient environment (at a relative humidity of about 80%). The device initially had a $V_{oc}$ of ≈0.76 V (at times from 0 to 5 h). Connecting to an external resistor ($R_L$=50 kΩ) yielded a continuous and gradually stabilized DC current of about 9 μA for 20 h (5 to 25 h). Then $R_L$ was disconnected and $V_{oc}$ was recorded (indicated by the arrow at t=25 h). $V_{oc}$ gradually increased to the initial value of 0.76 V (from 25 to 30 h), showing a self-recharging process. Reconnecting to $R_L$ yielded a repeated continuous powering to the $R_L$ (I is ≈9 μA) (30-50 h). Disconnecting the $R_L$ yielded a second self-recharging process (50-55 h), which brought $V_{oc}$ back to 0.76 V again. The inset shows the circuit diagram, in which connections to terminals 1 and 2 correspond to I and $V_{oc}$ measurements, respectively. E) The $V_{oc}$ and $I_{sc}$ in response to different temperature, for a device size of 0.25 $cm^2$ and thickness of 0.2 mm. Data represent the mean±standard deviation (n=4). F) Electric output of IHMEG device of 0.25 $cm^2$ size with external resistance varied from $10^1$ to $10^8$ Ω at 85% RH. The inset is the equivalent test circuit diagram. G) The dependence of power density on electrical resistance of the external circuit according to (F).
Figure 2:
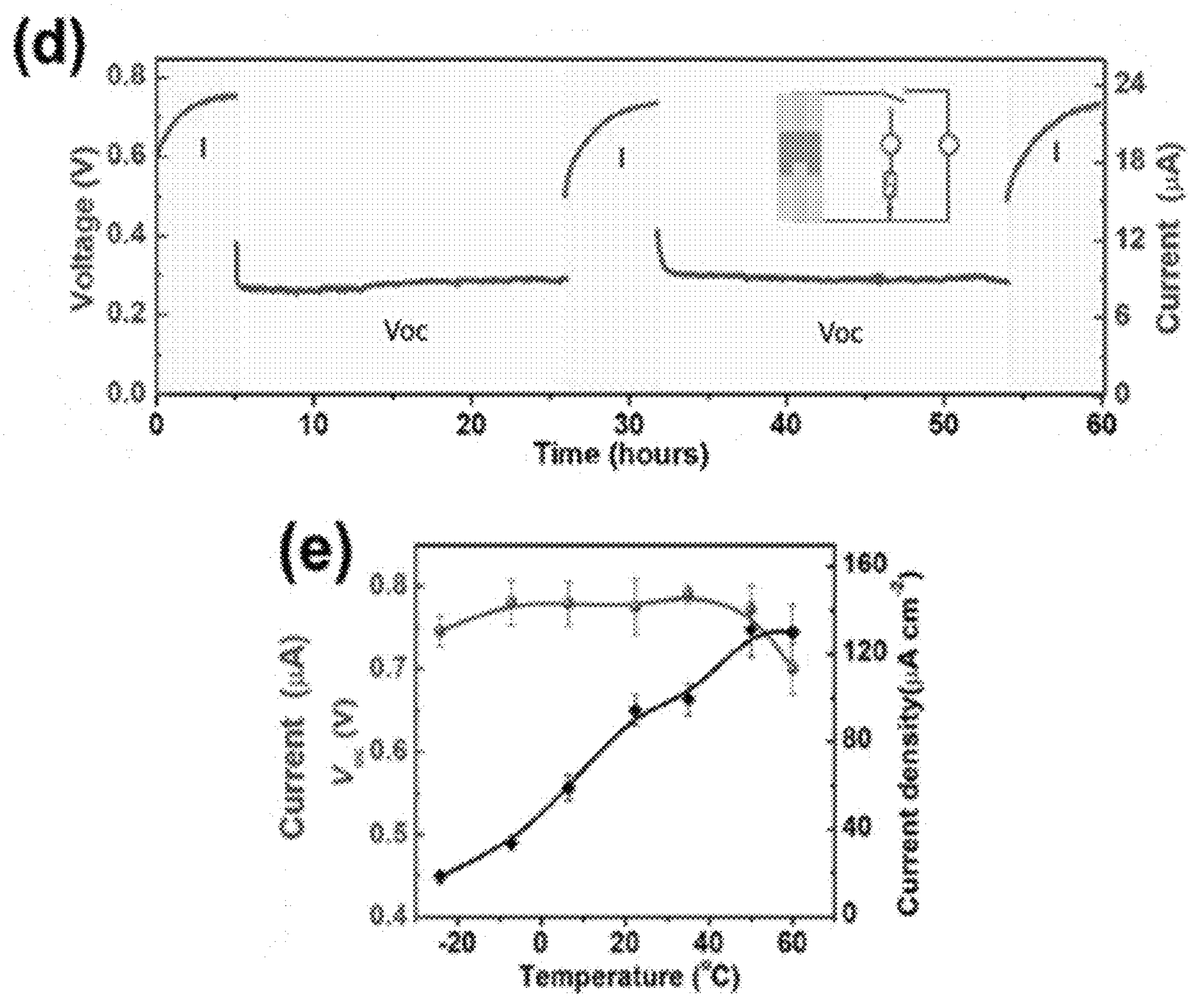
Figure 2:
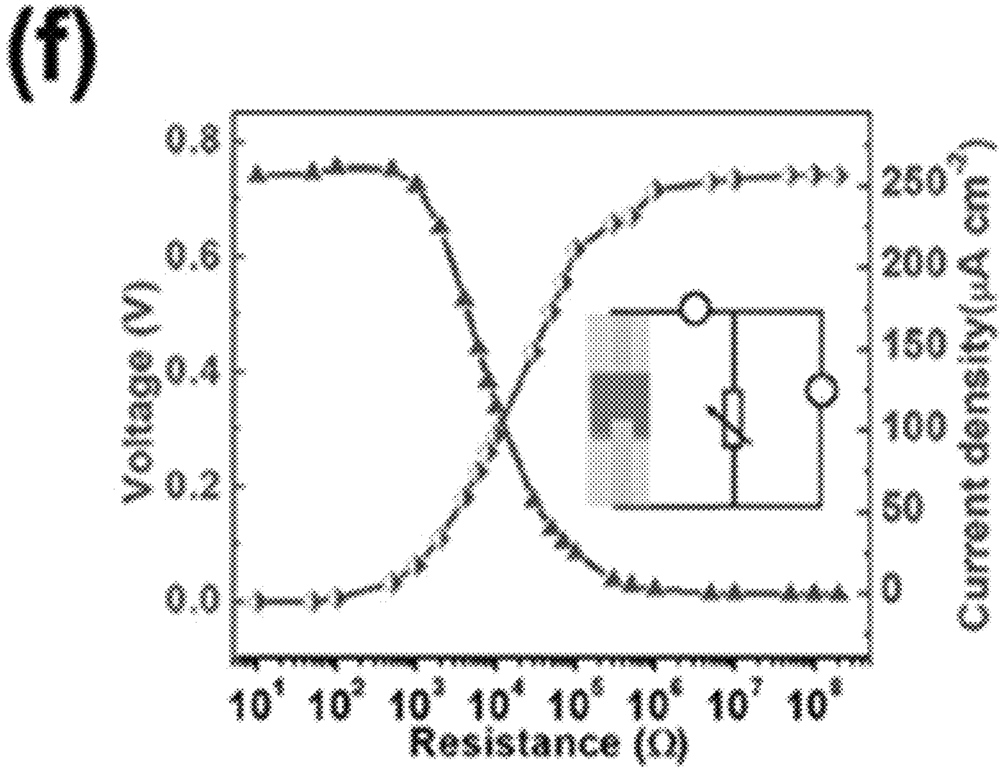
Figure 2:
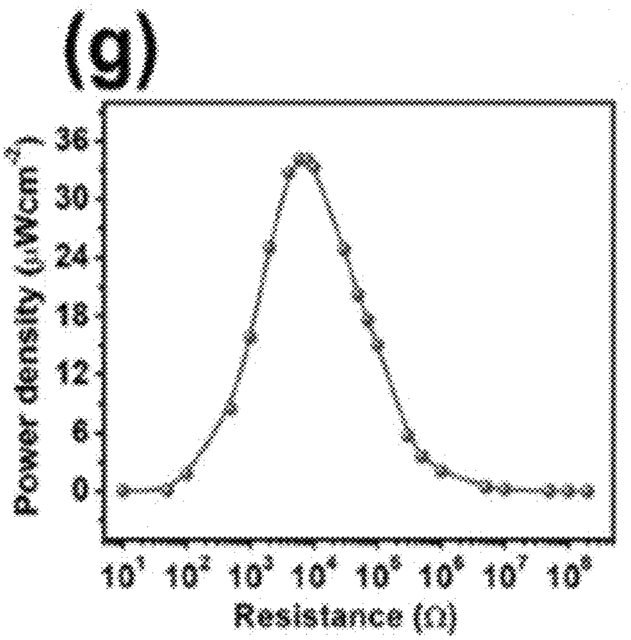

FIG. 2A shows voltage curves against time of the moisture power generating device under different humidity. The flexible moisture-enabled power generation device is easy to prepare, cost-effective, highly efficient, easy to scale-up.

In certain embodiments, the IHMEG can generate a continuous DC voltage of 0.22-0.88 V and a continuous DC current density of up to 238 μA $cm^{-2}$ under the humidity stimulation, and the output power is also outstanding among all the moisture power generation materials with continuous output mode in the relevant technology. The scaleup performance can be carried out by simple series and parallel operation. The generator can successfully power electronic watch, calculator, LED bulbs, electronic paper and other appliances.

The preparation process of the thin film and moisture generating device are described in greater detail below

Embodiment 1

(a) The first electrode was screen-printed on the polyimide film with conductive silver paste. The first electrode could be used for the following process after trying.

(b) The thin film was prepared as following: water and glycerol were uniformly mixed to prepare a binary solvent. Then polyvinyl alcohol (PVA): phytic acid with the weight ratio at the range of 20%-50% were added into the binary solvent. The mixture was dissolved at 95° C. for 2 hours to achieve a homogeneous solution.

(c) The mixed solution was dropped onto the first electrode prepared in advance at step (a). Typically, the thin film thickness was about 100 μm and the size was 1 $cm^2$. Finally, a copper electrode was electrically connected on the top surface of the thin film. A moisture-enabled power device was well prepared after aging overnight.

The two ends of the power generating device were connected to the electrical test instrument, and the moisture was absorbed and diffused from the upper surface of the moisture generating device, and the generated electrical signals are recorded in real time.

As shown in FIG. 2A, the single device can generate a continuous open-circuit voltage (0.22-0.88 V) under the stimulation of relative humidity (10%-90%). When the RH is above 40%, the voltage has a small fluctuation of about 0.8 V.

Figure 21:
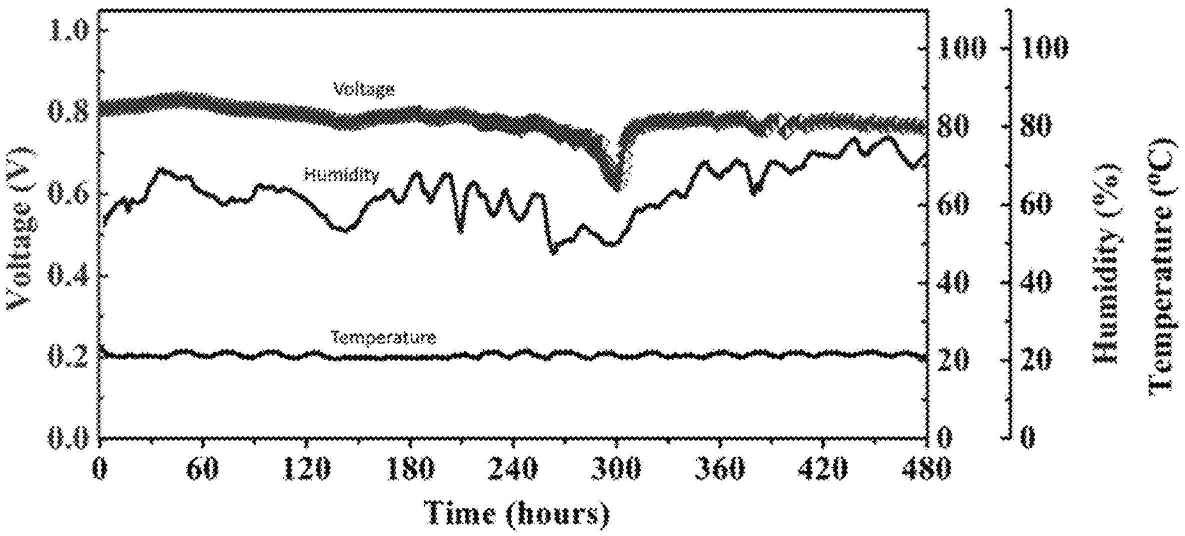
FIG. 21 depicts the continuous voltage output of a moisture power generating device of one embodiment of the invention over time under ambient environment. The ambient relative humidity and temperature were synchronously recorded.

FIG. 21 demonstrates a single device can deliver a continuous and stable DC voltage of about 0.8 V for more than 480 hours along with the ambient relative humidity fluctuation from 45% to 80% at room temperature.

FIG. 2D shows the single device with 1 $cm^2$ area and 100 μm thickness generates a continuous DC current of 9 μA for more than 20 h through a load resistor of 10 kΩ. Furthermore, $V_{oc}$ gradually increases to the initial value of 0.76 V to achieve a self-charging process.

Embodiment 2

Figure 22:
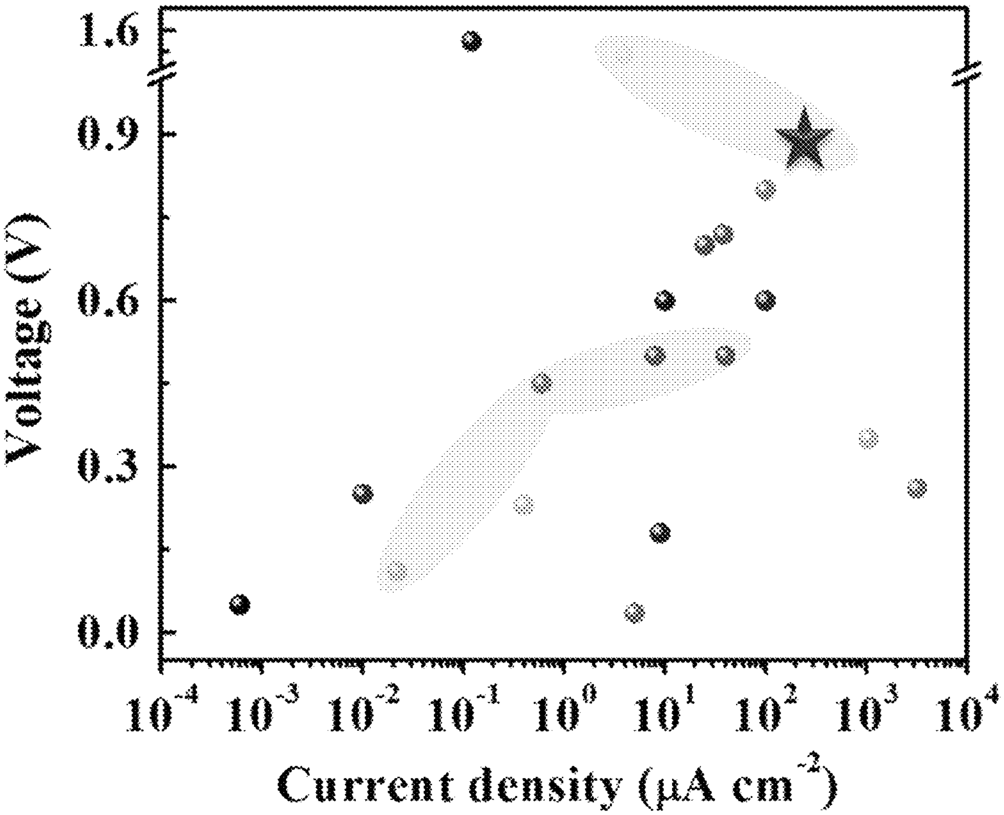
FIG. 22 depicts the performance comparison of known moisture-enabled generators. The star represents the performance of an IHMEG according to certain embodiments described herein. The areas shaded grey indicate that these moisture-enabled generators own continuous voltage output while others show intermittent output.

A power generation film and a moisture power generation device are prepared in accordance with the method basically the same as that in the Embodiment 1. The difference is that the thickness of the thin film is increased to 1.5 mm and the area decreased to 0.25 $cm^2$ The single unit device produces a DC short circuit current density of 238 μA $cm^{-2}$ at RH 80% and still maintain a high voltage of about 0.8 V. As compared in FIG. 22, most of the moisture-enabled generators demonstrate intermittent output feature for both voltage and current, which make it difficult to use directly in practical applications. Nevertheless, for a few moisture power generators capable to work constantly, the corresponding highest $V_{oc}$ is below 0.5 V and the $I_{sc}$ is smaller than 1 μA. In clear contrast, the device in this invention possesses the highest $V_{oc}$ of about 0.88 V and the largest $I_{sc}$ of 238 μA $cm^{-2}$. Estimating the areal power density by the equation of $(V_{oc} \cdot I_{sc})/4$, the areal power density is up to to 47 μW $cm^{-2}$, far outperforming previous moisture power generators that based on graphene oxide (0.07 μW $cm^{-2}$) and protein fiber (5 μW $cm^{-2}$) in a continuous work mode.

Embodiment 3

A power generation film and a moisture power generation device is prepared in accordance with the method basically the same as that in the Embodiment 1. The difference is that replacing the copper electrode by aluminum electrode. The thus prepared single device can generate a DC voltage of about 0.8 V under RH 85%.

A homogeneous hydrogel is constructed by PVA, PA, and binary solvent of glycerol-water. As illustrated in FIG. 1, on the skeleton of hydrogel, PA plays the crosslinking role on the gelated hydrogel by reacting with the hydroxyl groups on PVA chains. This hydrogel can spontaneously adsorb water molecules from moist air because of its great hydrophilic nature. The abundant micro- or nanopores of dehydrated hydrogel are well observed, providing large number of diffusion paths for ions (FIG. 7), The hydrophilic polymeric network of PVA-PA and hygroscopic glycerin medium enable the hydrogel a great platform to accelerate water absorption and ions migration. One single IHMEG device is connected to the bottom electrode printed on a flexible moisture barrier substrate (like paper, clothing, or poly (ethylene terephthalate) film) as shown in FIG. 1B. Due to the presence of moisture barrier substrate, the moisture absorption becomes asymmetrical from both sides, automatically forming a water gradient or an ion concentration difference with PA dissociation. To prepare IHMEG (PVA-PA-glycerol), PVA powder and PA solution were added into glycerol-water binary solvent and stirred at 95° C. for 2 h. The resulting homogeneous solution was immediately drop-casted on the moisture insulation substrate with prepared electrodes to form flexible and transparent hydrogel. The binary solvent of glycerol-water imparts remarkable anti-freezing and anti-drying feature of IHMEG device. A single IHMEG device can deliver a stable DC $V_{oc}$ of about 0.8 V for more than 1000 h under an open ambient environment with RH fluctuating from 60% to 90% at ≈22° C. (FIG. 1C), reflecting its outstanding working stability. Whereafter, the voltage output drops over 1020 h presumably due to the decreased water gradient. Such a steady DC voltage output of IHMEG, desperately needed for its intended applications, is different from the intermittent output voltage of many carbon-based MEGs.

It is highly desirable to develop a DC mode output of MEG for powering wearable electronics in all-weather conditions. The IHMEG devices were exposed in a wide range of relative humidity from 10% to 85% RH to determine its environmental humidity-dependent characteristics. Before the test, all samples were short-circuit processed to eliminate possible static electricity. Upon connecting with an external testing circuit at different RHs, the IHMEG generates the DC output signals of both $V_{oc}$ and $I_{sc}$ at a specific RH. The $V_{oc}$ was gradually charged to a steady state at each RH (FIG. 2A), and of great significance is that a stable $V_{oc}$ of ≈0.2 V can be generated even at a very low RH of 10%, demonstrating a strong all-weather work ability. A largest $V_{oc}$ of ≈0.88 V is observed at 85% RH. The $I_{sc}$ also presents DC mode output closely related to environmental humidity (FIG. 2B). An exponential rise of the $I_{sc}$ is shown with a gradual RH increase (FIG. 2C). The $I_{sc}$ increases from 0.08 μA at 10% RH to 2 μA at 45% RH, further comes up to an average value of 60 μA at 85% RH, two orders of magnitude increase in a row. The accelerated current mainly attributes to enhanced moisture absorption and more free ions diffusion at high humidity to improve electric performance of IHMEG device. In addition, this IHMEG, connected with an external resistor, delivers a steady current output of ≈9 μA even for more than 20 h, where the voltage is lowered to 0.5 V (FIG. 2D). Even so, it can restore to its original value after self-charging of 5 h, ready for another constant electrical discharge. A repeatable self-charged and consecutive discharge process has been well observed in FIG. 2D, further confirming steady power output capability of this IHMEG.

Figure 9:
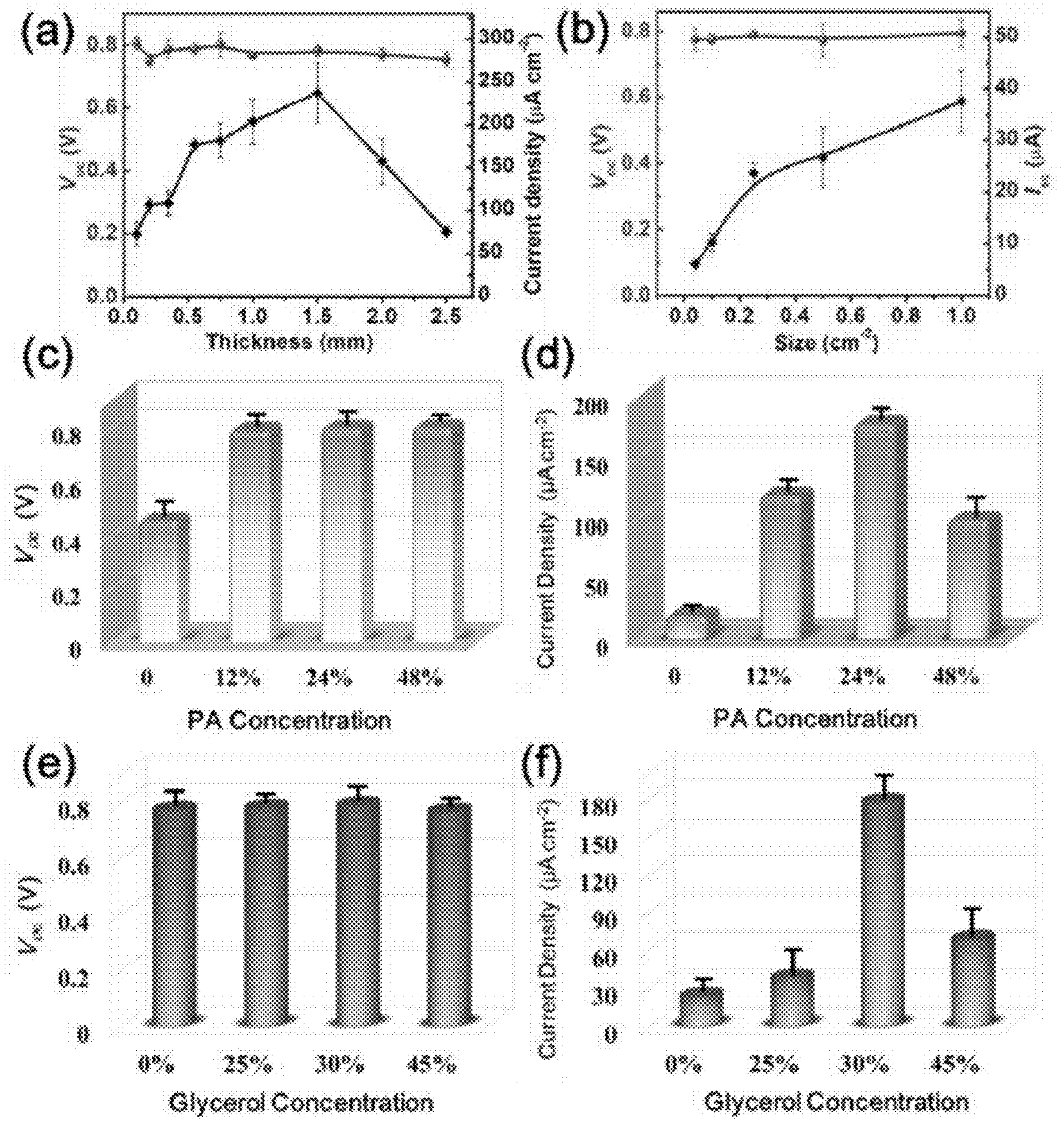
FIG. 9 depicts A) The Voc and Isc plotted against film thickness for a device size of 0.25 cm2. B) The Voc and Isc versus IHMEG film size for a film thickness of roughly 0.2 mm. C), D) The effect of PA wt % concentration in the hydrogel (relative to the weight of PA+PVA+water+glycerol) on open-circuit voltage and current density with device size of 0.25 cm2 and thickness of 0.55 mm. E-F) The effect of glycerol wt % concentration (relative to the weight of PA+PVA+water+glycerol) in the hydrogel on open-circuit voltage and current density. The test condition is at 80% RH. Data represent the mean±standard deviation (n=4).
Figure 10:
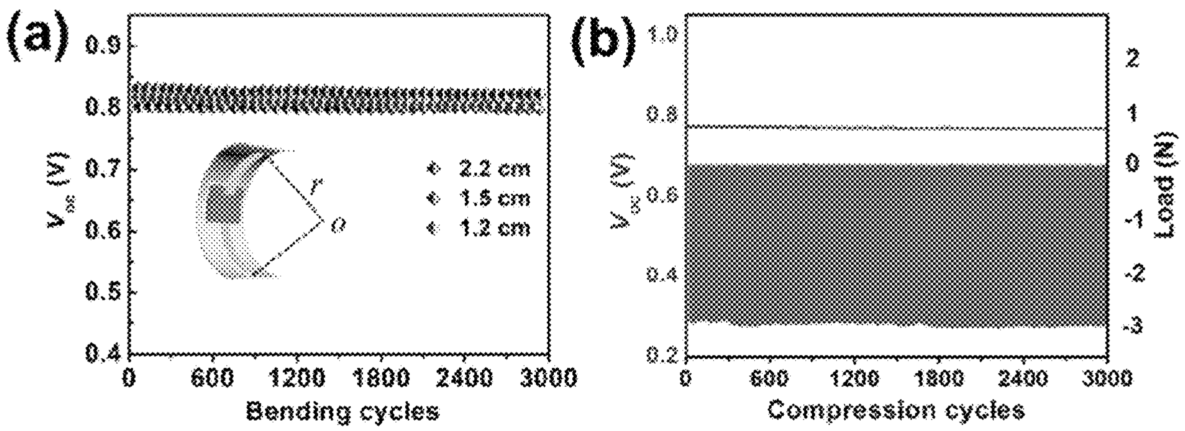
FIG. 10 depicts A) The voltage curves of a single IHMEG unit at different bending radii (1.2, 1.5 and 2.2 cm). The gauge length is 5 cm. B) Voltage curve of one single IHMEG cell with a compression load of 3 N for 3000 cycles at 70% RH.

The IHMEG is also applicable under a wide range of temperature. FIG. 2E shows that this IHMEG device engenders decent voltage output from −24 to 60° C. at 80% RH. The current value gradually increases to a platform along with the temperature raising. Different from RH influence, forming water gradient in the asymmetrical structure, the temperature mainly plays a role in improving ionic transport rate and then raises the current density at high value. Even at low temperature (−24° C.), due to excellent anti-freezing ability of glycerol, the IHMEG can still facilitate a small number of proton dissociation and transport with a low current density of about 18 μA $cm^{-2}$. Based on this result, Arrhenius equation is employed to analyze the activation energy of the temperature-dependent current density (FIG. 8). The activation energy ($E_a$) calculated from the slope of the Arrhenius plots gives a value of 16.63 KJ $mol^{-1}$, which indicates that vehicle type mechanism is the main contribution to the proton conductivity in our IHMEG device and will be discussed in the following. The device performance is also influenced by hydrogel thickness, size, and the contents of PA as well as glycerol (FIG. 9). With the thickness increasing from 0.1 to 1.5 mm, the current density raises up to 0.24 mA $cm^{-2}$ with stable voltage output of about 0.8 V. While the IHMEG with further thickening shows decreased current density due to long ion diffusion path. The highest volume power density is about 5.9 mW $cm^{-3}$ , which is comparable to that of protein-based MEG. Besides, the $V_{oc}$ maintains the same whereas the $I_{sc}$ is gradually enhanced with the increase of hydrogel size. Theoretically, the induced current scales linearly with the area of the IHMEG because of ion-based surface charging effect. The appropriate content ratio of PA and glycerol shows optimal power output (FIG. 9). In addition, the IHMEG exerts remarkable endurance and stability under mechanical deformation like bending or compression (FIG. 10), which is of great importance in practical applications. With all-weather adaptability and excellent electric-mechanical performance, IHMEG suffices most of the environmental scenarios over a wide range of RH (10% to 85%) and temperatures (−24 to 60° C.), promising a huge potential as green and wearable power source.

To further investigate the electrical output performance of the IHMEG device, the IHMEG device was connected to different external resistors. As shown in FIG. 2F, the output voltage increases while the current density decreases when the electric load varies from 10 Ωto 500 MΩ. A maximum power density of 35 μW $cm^{-2}$ was achieved at an optimal resistance of 10 KΩ (FIG. 2G). Most MEGs reported previously demonstrate intermittent output feature for both voltage and current, which hampers their practical applications indeed. On the other hand, although a few MEGs are capable to work continuously, their highest $V_{oc}$ is normally below 0.5 V and the $I_{sc}$ is smaller than 1 μA. On the contrast, our IHMEG possesses a high $V_{oc}$ of 0.88 V, an obviously larger $I_{sc}$ of 60 μA, and a maximum output power of 35 μW $cm^{-2}$, 500 times of that of the best MEGs based on graphene oxide (0.07 μW $cm^{-2}$) or 7 times of that of protein fiber (5 μW $cm^{-2}$) in a DC work mode with only moisture-enabled electric generation. The outstanding current density mainly benefits from ionic hydrogel network with moisture capturing ability and fast ion transport capability.

Figure 3:
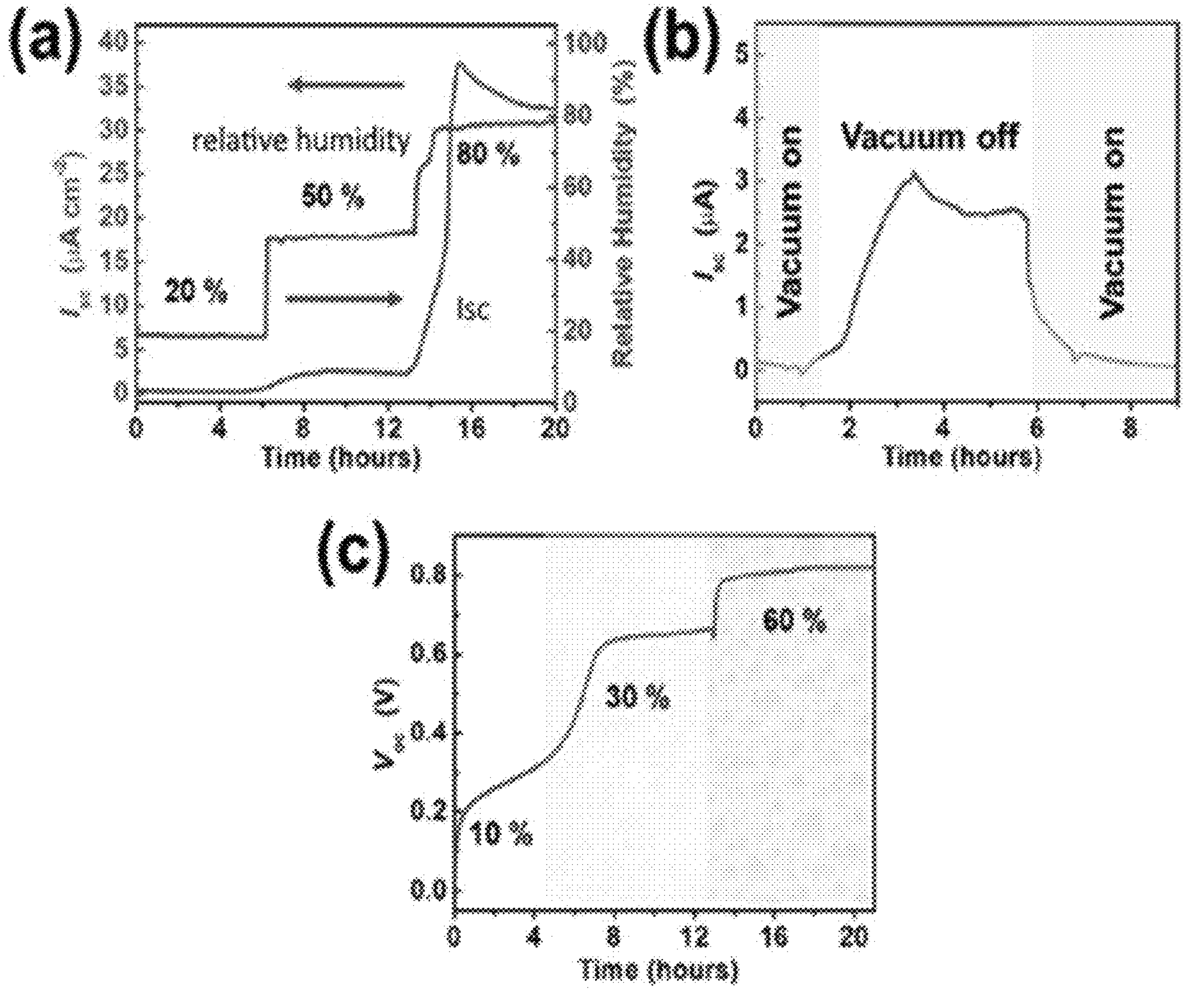
FIG. 3 depicts the analysis of energy-generation derivation. A) Evolution of $I_{sc}$ with step-changes of relative humidity versus time. B) Stepwise current development under vacuum-relief-vacuum environment. C) The $V_{oc}$-versus-time plot in response to the step increase in relative humidity. Before test, the IHMEG device was vacuumed and dried for 2 days. D) Polarity test of the IHMEG device. The sign of the induced voltage is reversed after the electrodes of the source-meter are turned over. E) The output voltage of the IHMEG before and after turning over the upper side of hydrogel to the moisture barrier substrate, corresponding to the pink and brown curve, respectively. F) Comparison of $V_{oc}$ and $I_{sc}$ made from PVA, PVA-PA, and PVA-PA-glycerol (IHMEG). Data represent the mean±standard deviation (n=4). G) The moisture uptake capability with time after the dried samples are exposed in the atmosphere (60% RH). H) The in situ FTIR spectrum tracking once the samples are exposed in the atmosphere (60% RH) versus time for PVA-PA-glycerol. i) The semi-quantitative analysis of water-absorbing peak (3700-3000 $cm^{-1}$) with time.
Figure 3:
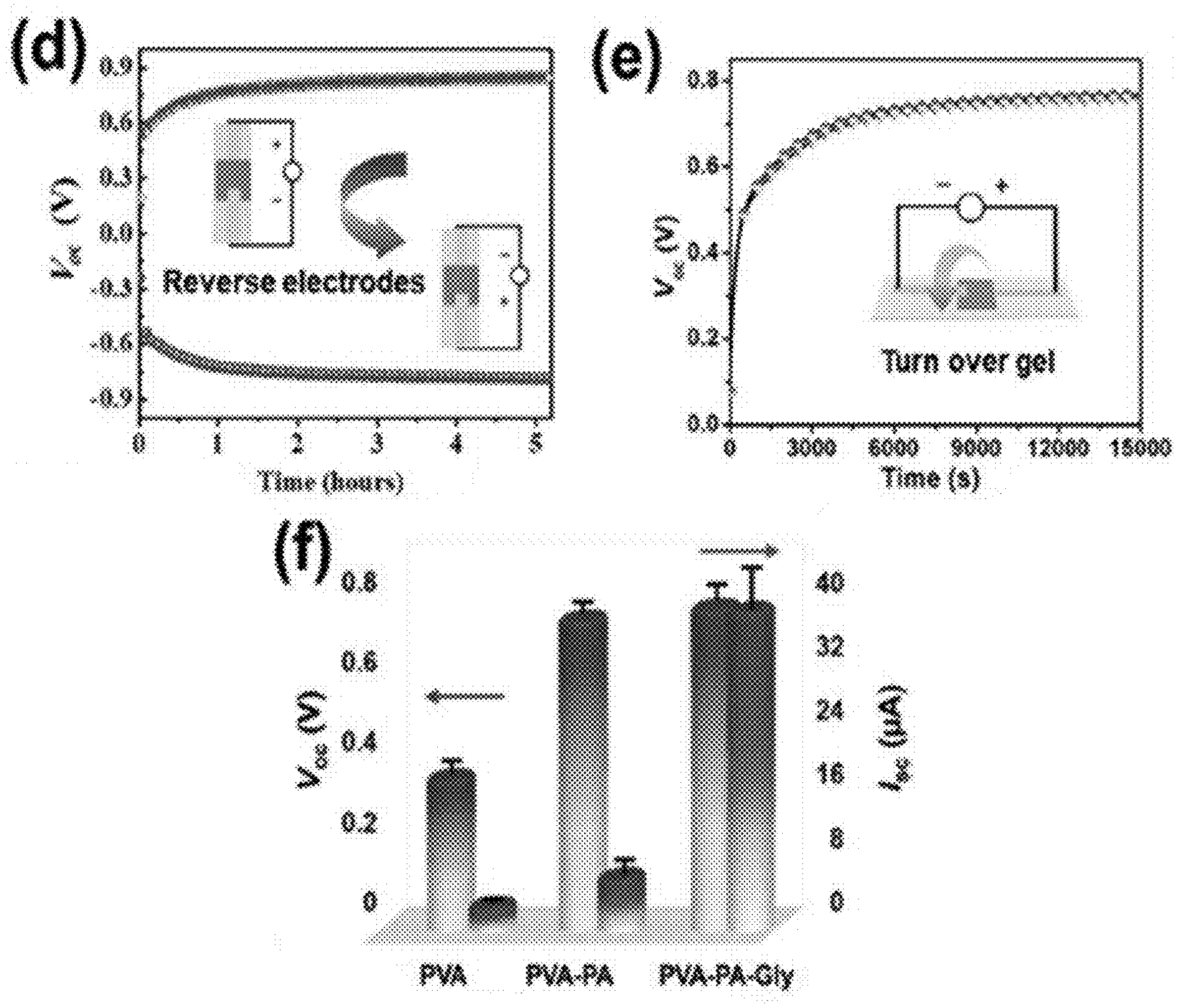
Figure 3:
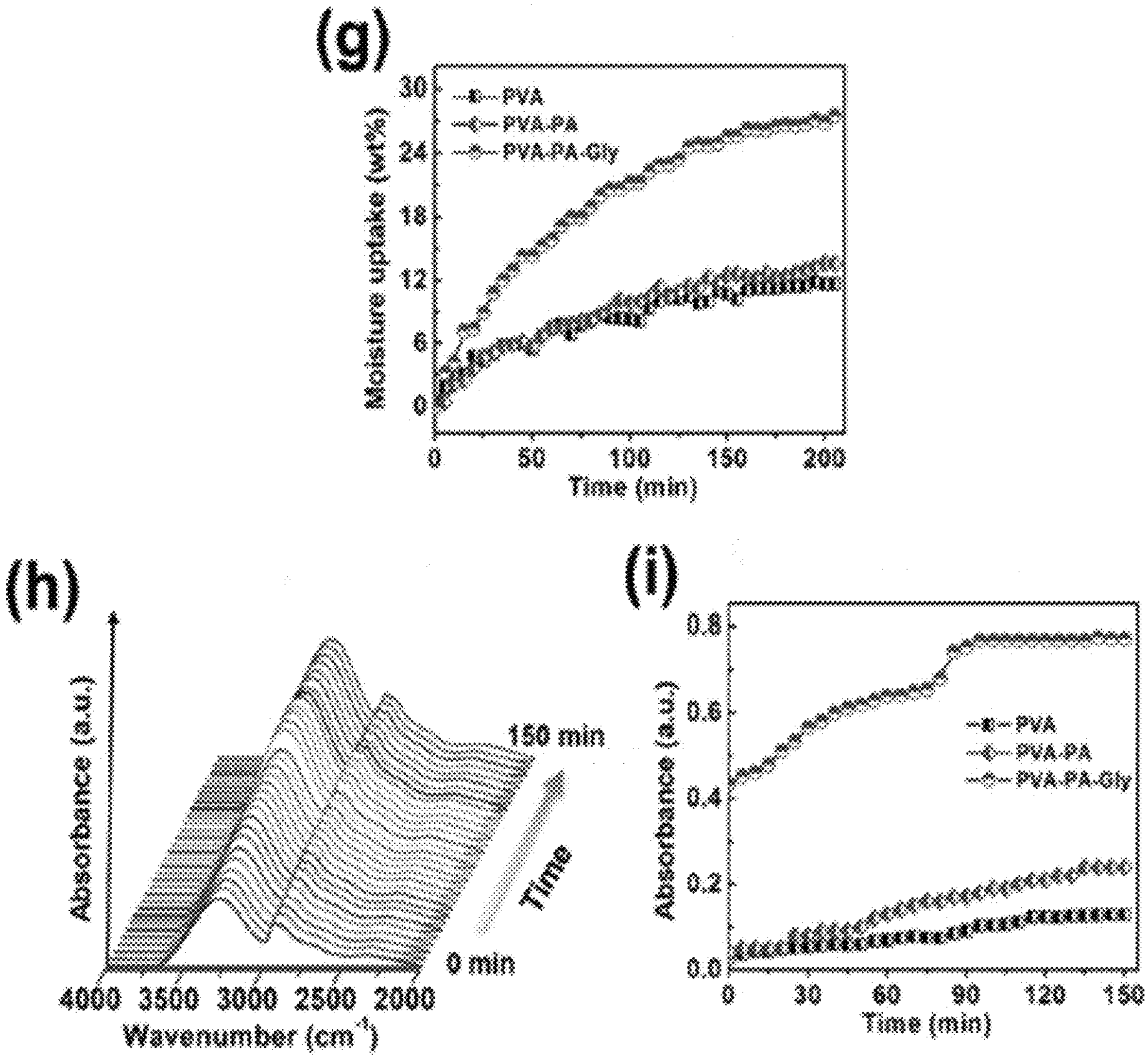

The electric output performance of IHMEG is deeply influenced by moisture and its ingredients. From FIG. 3A-C, it is clearly observed that the atmosphere humidity serves as the source of energy input to the IHMEG device. On one hand, the current s highly sensitive to the humidity. When RH increases stepwise from 20% to 80%, the current shows a gradient advance up to 33 μA. Furthermore, the current is immediately promoted after relieving the vacuum and then the electric output is drained followed by immediate vacuuming (FIG. 3B), On the other side, the IHMEG device generates low voltage output after 2 days' dehydration at 10% RH, Whereafter, the elevated humidity facilitates the gradient elevation of electric output to about 0.8 V (FIG. 3C), well consistent with above-mentioned humidity-dependent electric performance (FIG. 2C). Besides, due to the presence of the moisture-barrier layer, there exists the asymmetric moisturizing direction for IHMEG impacting the potential generation. FIG. 3D shows that the lower-moisture side of IHMEG device always has a higher potential. When the positive electrode of testing circuit is connected to the bottom electrode with lower humidity (red curve), the induced voltage is positive. Once exchanging the connection, the opposite voltage output (black curve) is presented. Furthermore, when the upper side of the hydrogel is turned over to contact the moisture barrier substrate, the voltage remains unchanged a little (FIG. 3E). That means the power generation is dependent on the moisturizing direction. Dynamic asymmetric moisture absorption process in IHMEG occurs spontaneously when exposed to the air, which creates distinct moisture gradient between the top surface and the bottom of the hydrogel. Then the moisture starts to migrate from top to bottom, along with dissociated protons from the structure of PA. Due to excellent water-absorbing ability of hydrogel, the IHMEG lowers the RH threshold to initiate ion dissociation and migration. Consequently, higher levels of voltage and current generate. Otherwise, extremely low RH or little moisture difference encumbers ion transport and then results in low voltage and current.

Figure 11:
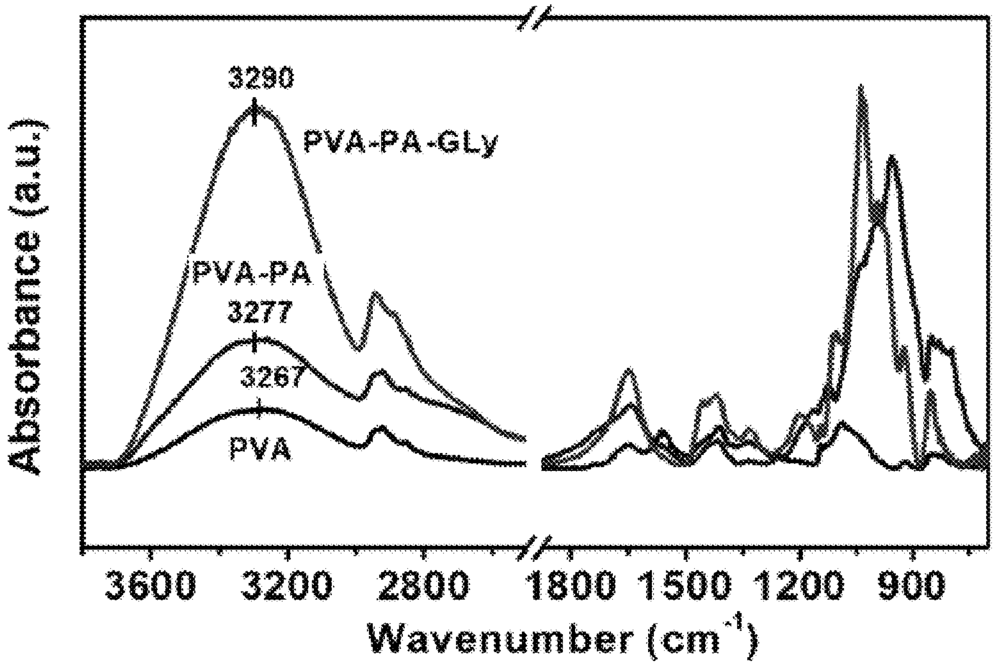
FIG. 11 depicts the FTIR spectra of PVA, PVA-PA and PVA-PA-Glycerol at 70% RH.
Figure 12:
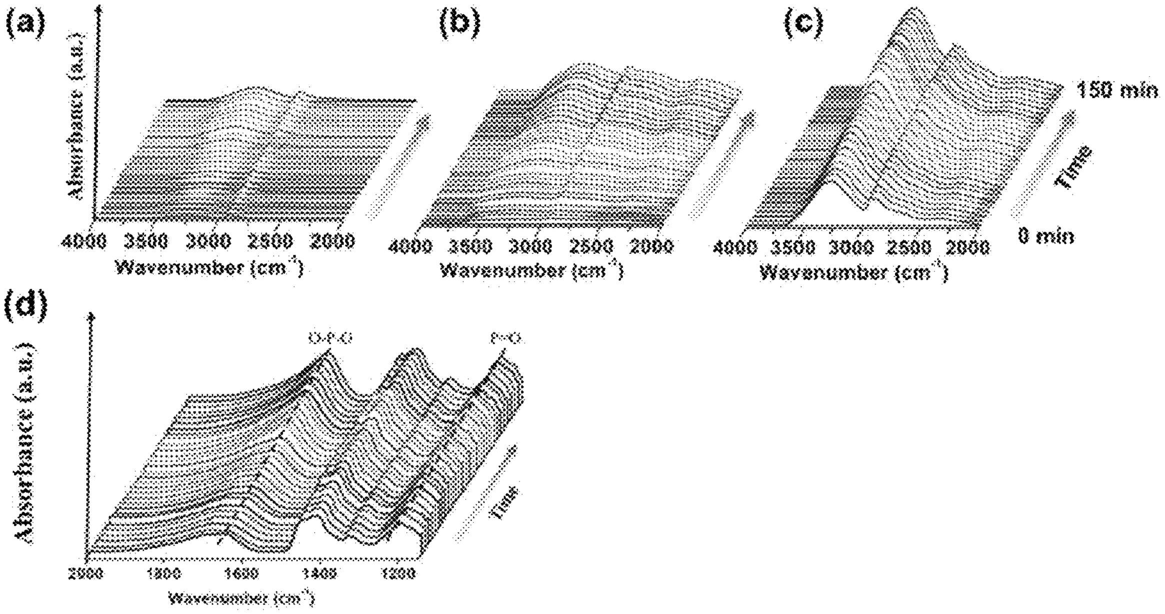
FIG. 12 depicts the underlying mechanism analysis of composition effect. A-C) The in situ FTIR spectrum tracking once the samples are exposed in the atmosphere (60% RH) versus time for PVA, PVA-PA and PVA-PA-Glycerol, respectively. The hydrogen bond (3600-3000 cm−1) is closely related to water absorption process. D) The in situ FTIR spectrum tracking (2000-1100 cm−1 region) once the samples are exposed in the atmosphere versus time for PVA-PA-Glycerol.

The compositions of from ionizable polymeric network of PVA-PA and hygroscopic glycerol medium exert a synergistic effect on elevating the output power. The control sample PVA film delivers a low voltage output of 0.38 V and an extremely low current, which is consistent with previous report. Once the PA is added into the matrix, the voltage has a doubling increase as shown in FIG. 3F. It is mainly because PA plays as the crosslinking points with the hydroxyl groups on PVA chains. Once exposed in the moisture, the protons dissociate from the PA, while the skeletons of PA still adhere to the PVA chains, then forming an internal electric field and improving voltage output. More importantly, there appears a significant improvement of current for the IHMEG (PVA-PA-glycerol) with the addition of hygroscopic glycerol medium. Herein glycerol significantly enhances the moisture absorption capability of IHMEG meanwhile forms weaker H-bond interaction within hydrogel (FIG. 11), then facilitating the easier ionization and faster transport of the protons. The improved moisture-uptake capability is further confirmed by weighting and time-resolved FTIR spectroscopy. FIG. 3G demonstrates the moisture uptake rate increases very fast first followed by a slower increase process for these three samples. Finally, the whole samples maintain a dynamic equilibrium with water absorption and desorption. Clearly, PVA-PA-glycerol hydrogel exhibits the fastest and maximum water absorption capability. The PVA and PVA-PA show inferior moisture uptake process due to stronger H-bond interactions for PVA and PVA-PA (FIG. 11). In addition, time-resolved FTIR spectroscopy as a powerful tool was employed to provide insights into the influence of dynamic absorption and diffusion processes of water molecules on the electric-generation performance for the first time (FIG. 3H). The peak intensity of O—H stretching absorption peaks at the range of 3700-3000 $cm^{-1}$ is closely related to water absorption, which has been in situ tracked over time for PVA, PVA-PA, and PVA-PA-glycerol once they are exposed in the atmosphere of 60% RH (FIG. 12). O—H stretching absorption peaks enhance with the moisture absorption, followed by reaching a platform. After normalizing the intensity of absorption peak, the absorption and diffusion curves of the water are compared and illustrated in FIG. 31. Similarly, PVA-PA-glycerol hydrogel demonstrates the highest absorption peak and the strongest ability to adsorb and accommodate more water. It seems that the ionizable polymeric network of PVA-PA can mainly enhance the voltage but not the current. The elevated current density in IHMEG mainly benefits from the high-capability moisture sorption and weaker H-bond interaction of IHMEG hydrogel network, which accelerates ionization of PA and facilitates rapid mass ion migration in IHMEG. Instead, PVA and PVA-PA with inferior water uptake capability and stronger H-bond interactions lead to less water absorption and a rather slow water diffusion process. The corresponding small moisture-water chemical energy conversion is still not enough to dissociate protons within polymeric network of PVA-PA due to the PVA chain entanglement and the physical crosslinking with PA. Consequently, PVA and. PVA-PA present small current densities. These results clearly manifest the synergistic effect of ionizable polymeric network of PVA-PA and hygroscopic glycerol on the high power generation of PVA-PA-glycerol hydrogel.

Figure 4:
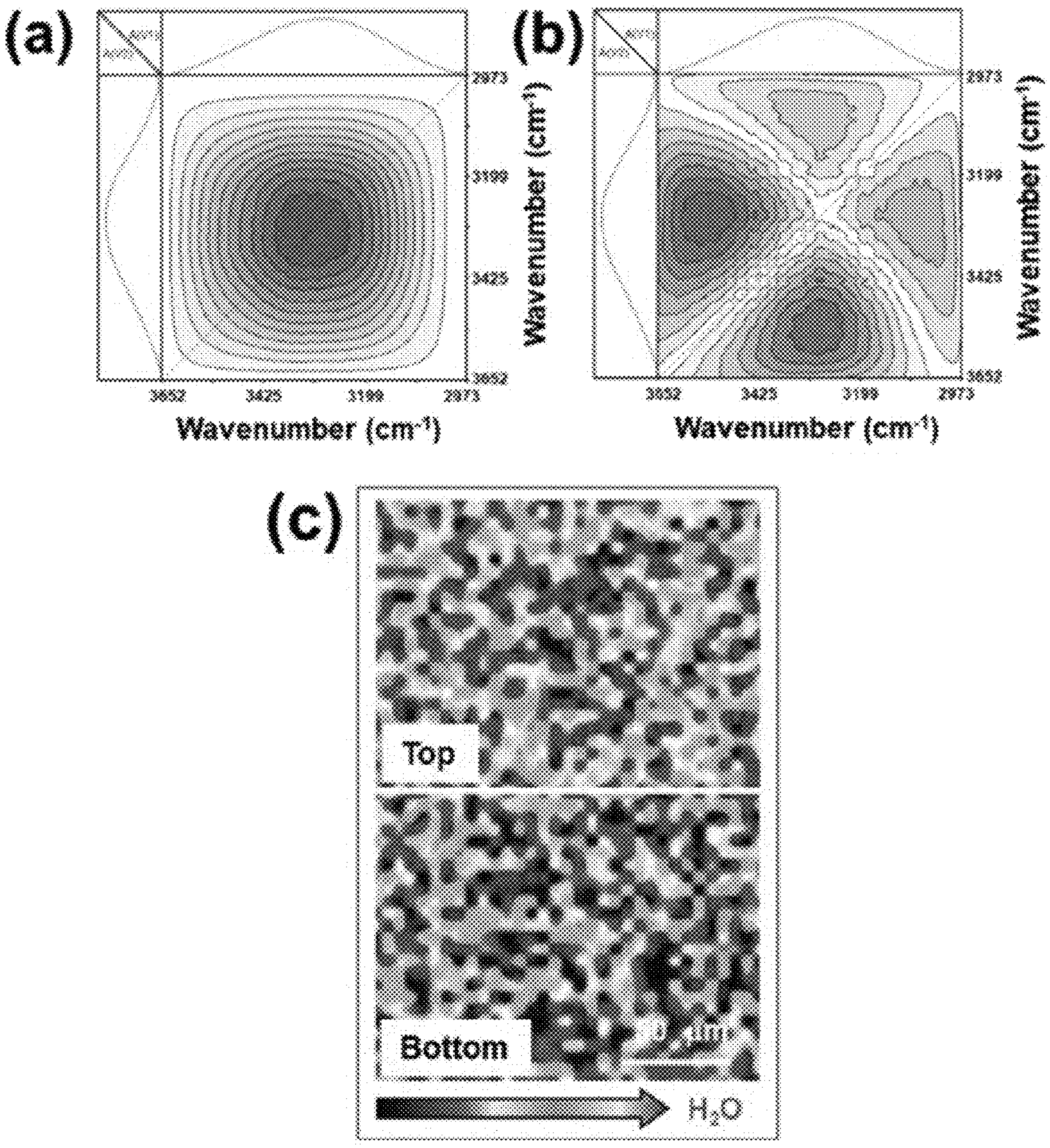
FIG. 4 depicts the underlying mechanism of IHMEG. 2D-FTIR correlation spectra in the 3700-3000 $cm^{-1}$ wavenumber region: A) synchronous; B) asynchronous contour maps for IHMEG samples when exposing in the air. The top area and bottom area denote the positive and negative correlation peaks, respectively. C) The water diffusion difference between the top and the bottom surface of hydrogel by 2D Raman mapping after 120 min. D) Photos of the experiment for visualizing the dynamic change of the moisture-induced ionic diffusion process. A piece of the hydrogel is sandwiched between the open ends of two cylindrical containers, the upper tube has two open ends and the bottom one has one open end and one closed end. They are filled with bromophenol blue/isopropanol solution. Water is added into the upper tube through the open end. The color change in the two tubes indicates the dynamic diffusion of dissociated protons with water diffusion, E) Schematic plot of the setup for the Kelvin probe force microscope (KPFM) test and F) the potential change of hydrogel. A piece of hydrogel (250 μm thickness) absorbed moisture from one side and the other side was covered without wetting. The potentials of the two sides are detected by KPFM. The scan range is 5×5 μm. The lower right picture shows the potential increment of the hydrogel after water diffusion from the wetting side to non-wetting side from 15 to 30 min. G) The proposed mechanism of moisture-induced ionic diffusion process.
Figure 4:
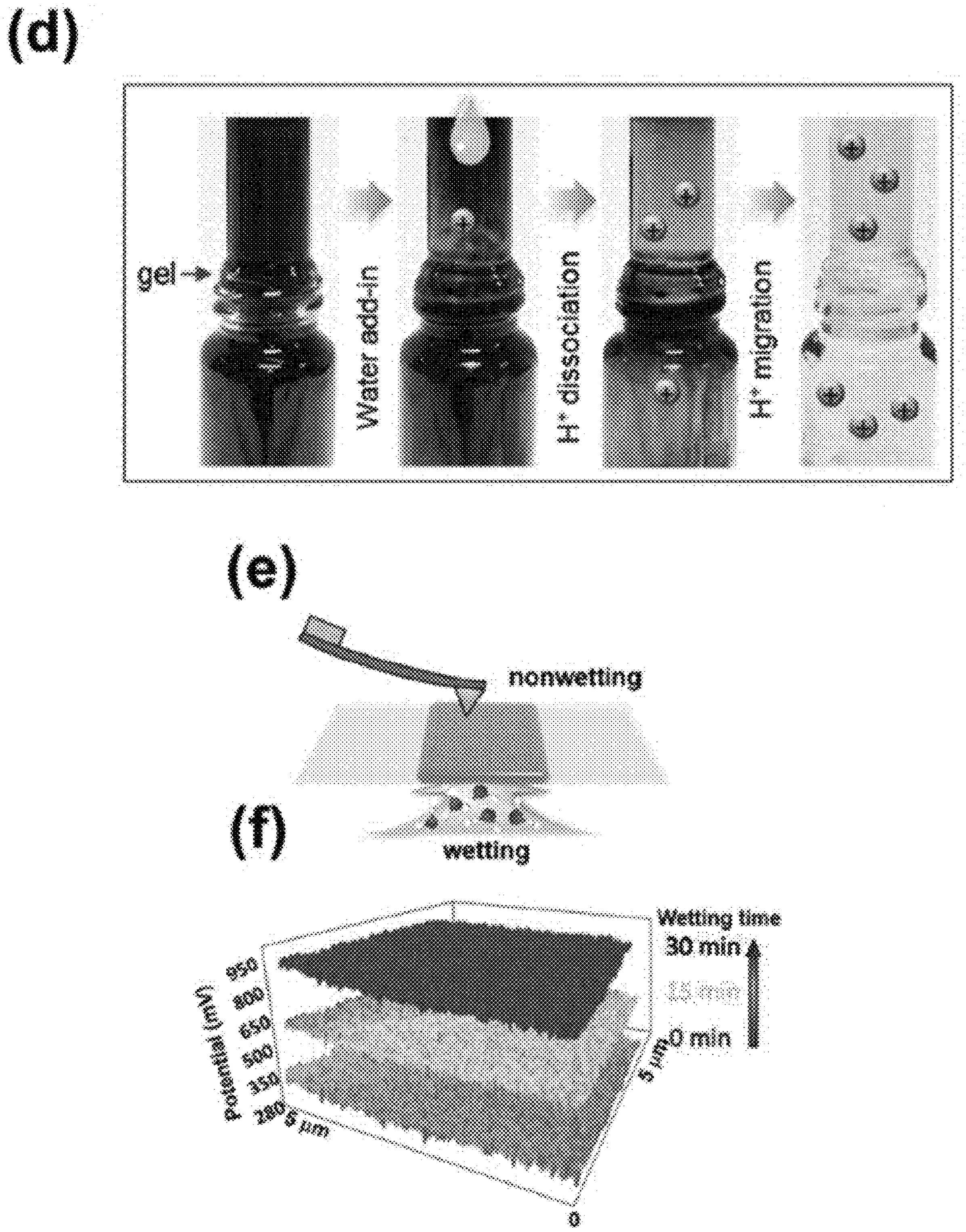
Figure 4:
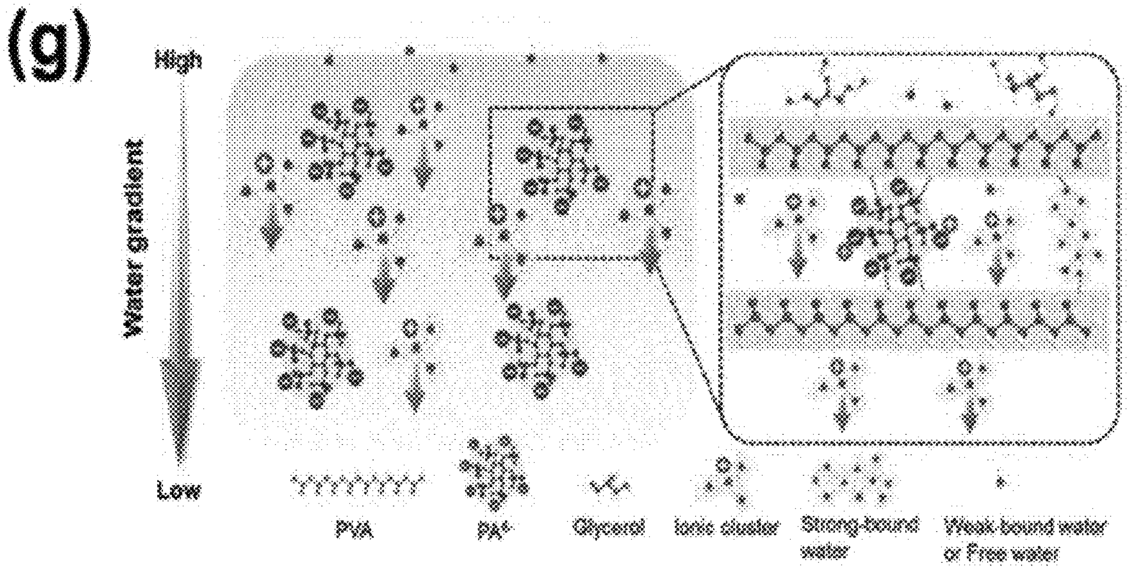
Figure 13:
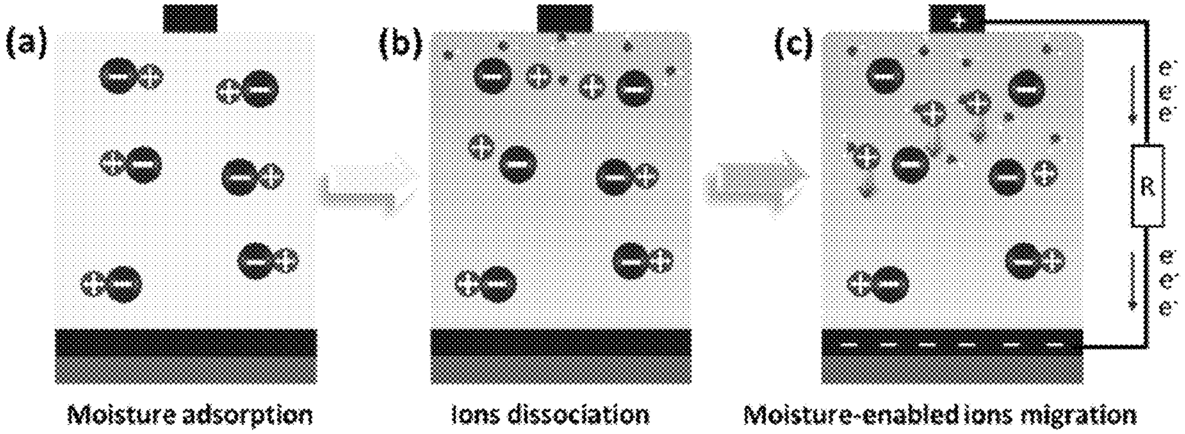
FIG. 13 depicts the three steps to generate the potential.

Many theoretical models have been proposed to explain electric generation by using various water motions, such as water dragging model, water-infiltration model, water-evaporation model, and gradient ion diffusion model. As for the MEGs, herein, moisture absorption enabled proton dissociation and transport have been proposed to account the power generation of MEGs in previous works. Noteworthy, this ionic hydrogel based MEG also abides by this principle. In details, two key points should be responsible for the enhanced power output, that is, improved moisture uptake capability and accelerated ion diffusion process. The PVA-PA-glycerol hydrogel has been proved as a great platform to capture mass gaseous moisture, which is further turned into liquid state, meanwhile releasing enough chemical potential energy to enable the ion dissociation of PA (FIG. 13). Furthermore, the weaker hydrogen band within IHMEG hydrogel empowers a rapid ion transport compared to PVA film with stronger hydrogen band. Thus, the IHMEG generates a higher current density and voltage output than control one. On this basis, we further reveal the underlying mechanism from the molecular level to gain deeper insight and more comprehensive understanding of moisture-enabled electric generation phenomenon by hydrogel-based MEG. Herewith, a powerful technique, 2D-FTIR spectroscopy was further employed to investigate molecular interactions during the water diffusion into IHMEG by deconvoluting highly overlapped bands for the spectral range of 3700-3000 $cm^{-1}$ (FIG. 4A). Synchronous and asynchronous spectra were depicted explicitly in FIG. 4A-B.

Figure 14:
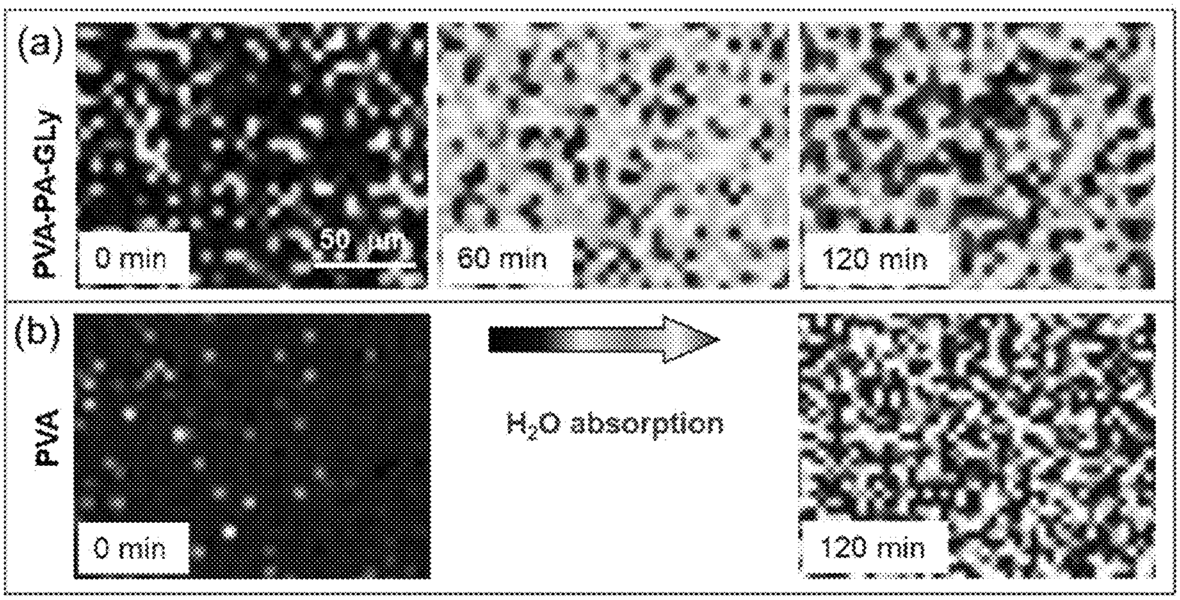
FIG. 14 depicts in-situ micro-Raman spectroscopy mappings of the top surface of IHMEG A) and PVA B) with absorbed moisture. The test conditions are 65% RH.
Figure 15:
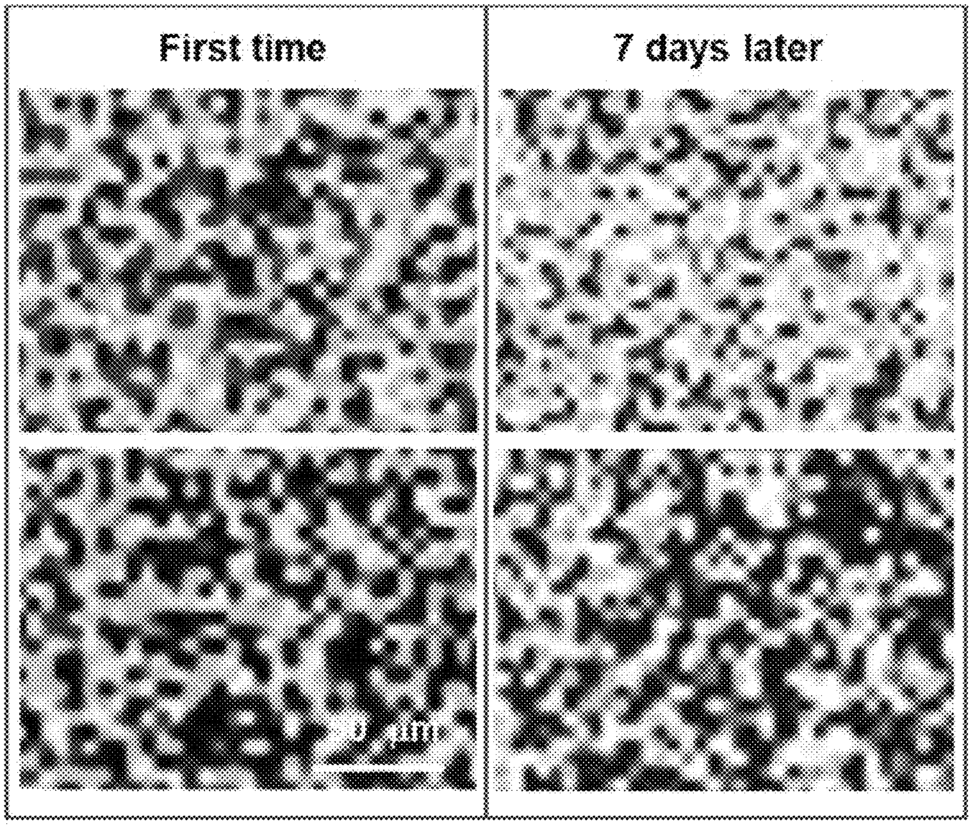
FIG. 15 depicts the water diffusion difference between the top and the bottom surface of hydrogel by 2D Raman mapping after 120 min (left part) and the comparison of water diffusion difference after 7 days later. The result shows that after 7 days later, the PVA-PA-Glycerol hydrogel demonstrates a similar moisture absorption ability. Besides, the surface and bottom surface of hydrogel also shows distinct water gradient, suggesting the long-standing water gradient exist in the PVA-PA-Glycerol hydrogel.

One strong and positive peak in the synchronous spectrum (FIG. 4A) indicates that the O—H stretching band of water strengthens with the water diffusion. Asynchronous spectra in FIG. 4B shows two negative cross-peaks ($^{3544}/_{3290}$, $^{3436}/_{3290}cm^{-1}$) and one positive cross-peak ($^{3290}/_{3075}cm^{-1}$) in the upper left side of the main diagonal, indicating that the water stretching band is split into four separate bands located at 3544, 3436, 3209, and 3075 $cm^{-1}$. The four bands vary following the total sequential order is 3290→3075→3544, 3436 $cm^{-1}$. This result elucidates at least the formation of four different states of water in IHMEG matrix, corresponding to strong bound water (3075 $cm^{-1}$) forming strong hydrogen bonds between each water molecule or with polymer internal network, cluster water (3290 $cm^{-1}$) forming moderate hydrogen bonds with easy-coupled ions, weak bound water (3436 $cm^{-1}$) interacting with hydrophilic groups in polymer matrices, and free water (3544 $cm^{-1}$) approximately without hydrogen bonding with other molecules. Hence the water diffusion follows the sequence: cluster water→strong bound water→weak bound water, free water. That means the water diffuses into the IHMEG membrane in the cluster water forms first as illuminated in FIG. 4G. The strong bound water moves more slowly with its stronger hydrogen bonds and its larger size, which are further confined in the cross-linked hydrogel network and form weak-bound water or free water molecularly dispersion within dense nanopores of hydrogel network. The low dissociation constant (pKa≈1.5) of the six protons of PA enables their easy dissociation when encountering the sufficient cluster water, then forming protonated water clusters ($H_3O^+$or $H^+(H_2O)_n$). As indicated in FIG. 8, the vehicle type mechanism made the main contribution to the high proton conductivity in our IHMEG device In this situation, $H_3O^+$or $H^+(H_2O)_n$ ionic clusters transport as a vehicle to form a large diffusion current and internal potential (FIG. 4G). Besides, in situ Raman spectroscopy mapping was employed to track the sorption path of water molecules on hydrogel surface by detecting Raman band ratio O—H bond/C—H bond (FIG. 4C). The result shows that a prominent color change is well observed with the time of moisture sorption (FIG. 14). More importantly, the long existence of moisture gradient between two sides is well observed by in situ 2D Raman mapping even after 7 days (FIG. 15). The top surface of hydrogel has obviously captured more water molecules than the bottom surface, which induces a built-in water gradient. These water molecules keep a dynamic absorption-desorption exchange at the interface to provide a sustained energy input. Hence, by virtue of enhanced moisture capture and fast ion transport of porous hydrogel network, as well as remained moisture gradient, IHMEG generates a stable electric output. While the PVA film owns strong hydrogen bond, which is so hard to dissociate the ions from the surface meanwhile the strong hydrogen bonds make it difficult to water diffusion, leave alone the ion dissociation and diffusion.

Figure 16:
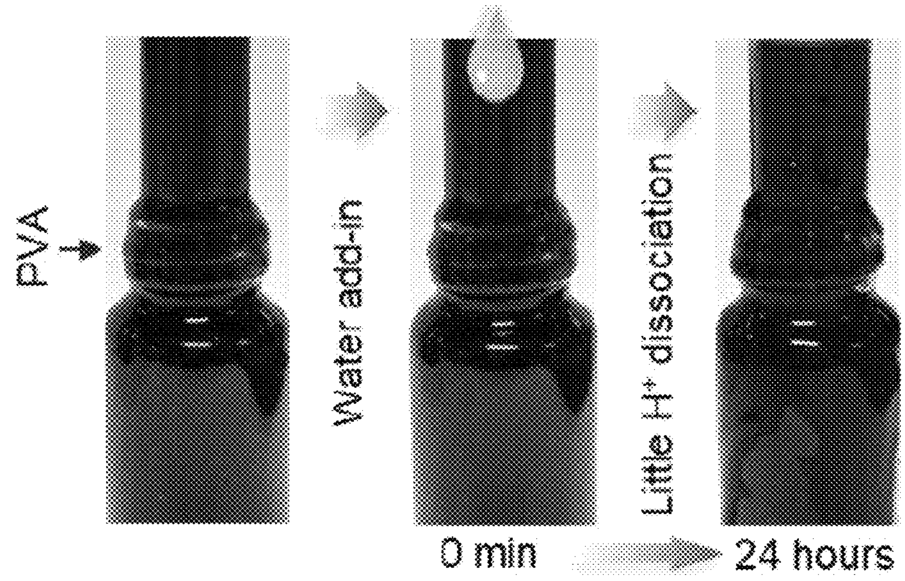
FIG. 16 depicts Photos of the experiment for visualizing the dynamic change of the moisture-induced ionic diffusion process within PVA.
Figure 17:
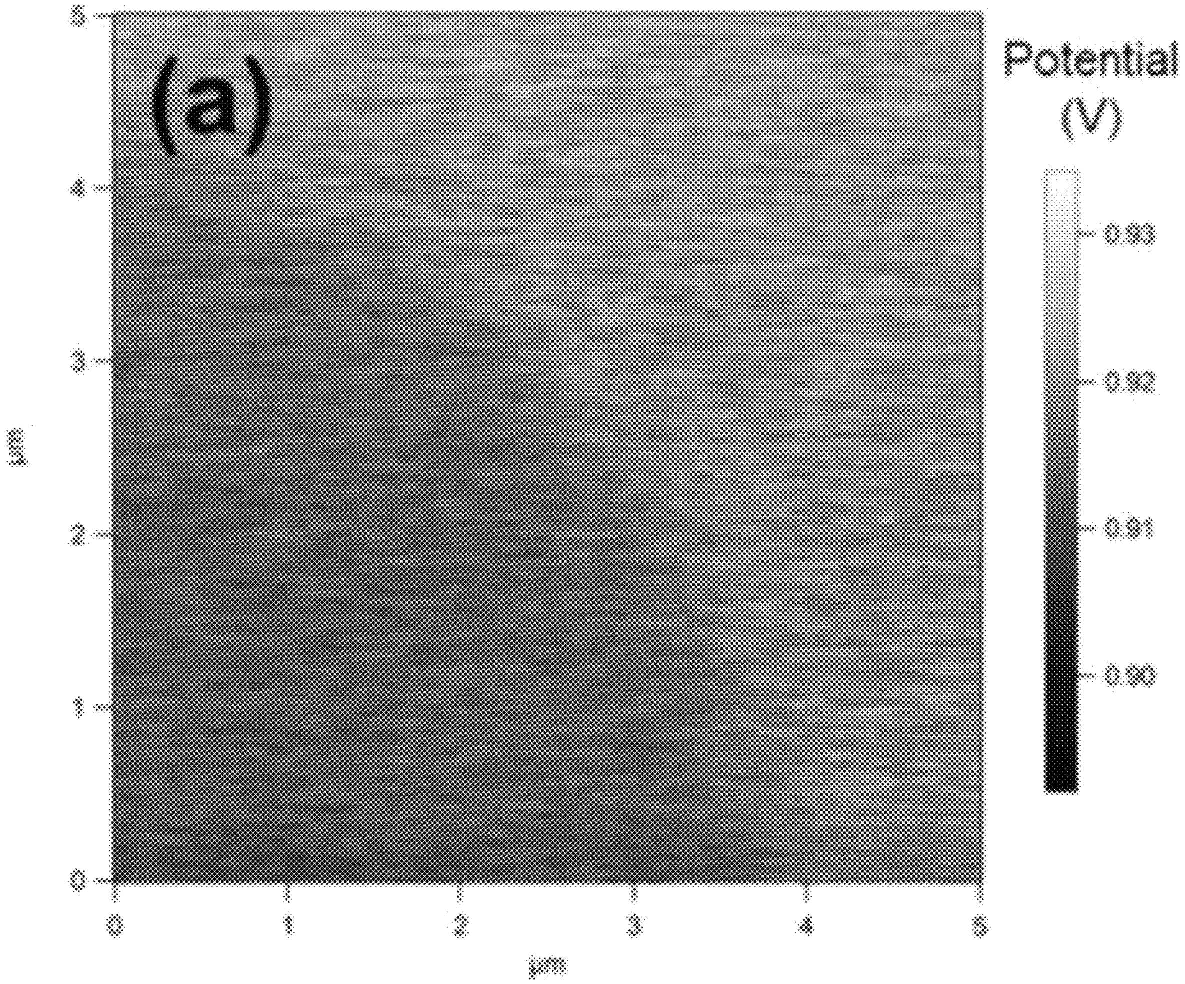
FIG. 17 depicts The potential acquired from KPFM of the side moisturized after 0 min A), 15 min B), 30 min C). The potential detection of the IHMEG membrane acquired from KPFM data show that during the moisturizing, the potential of the moisturized side keeps almost unchanged.
Figure 17:
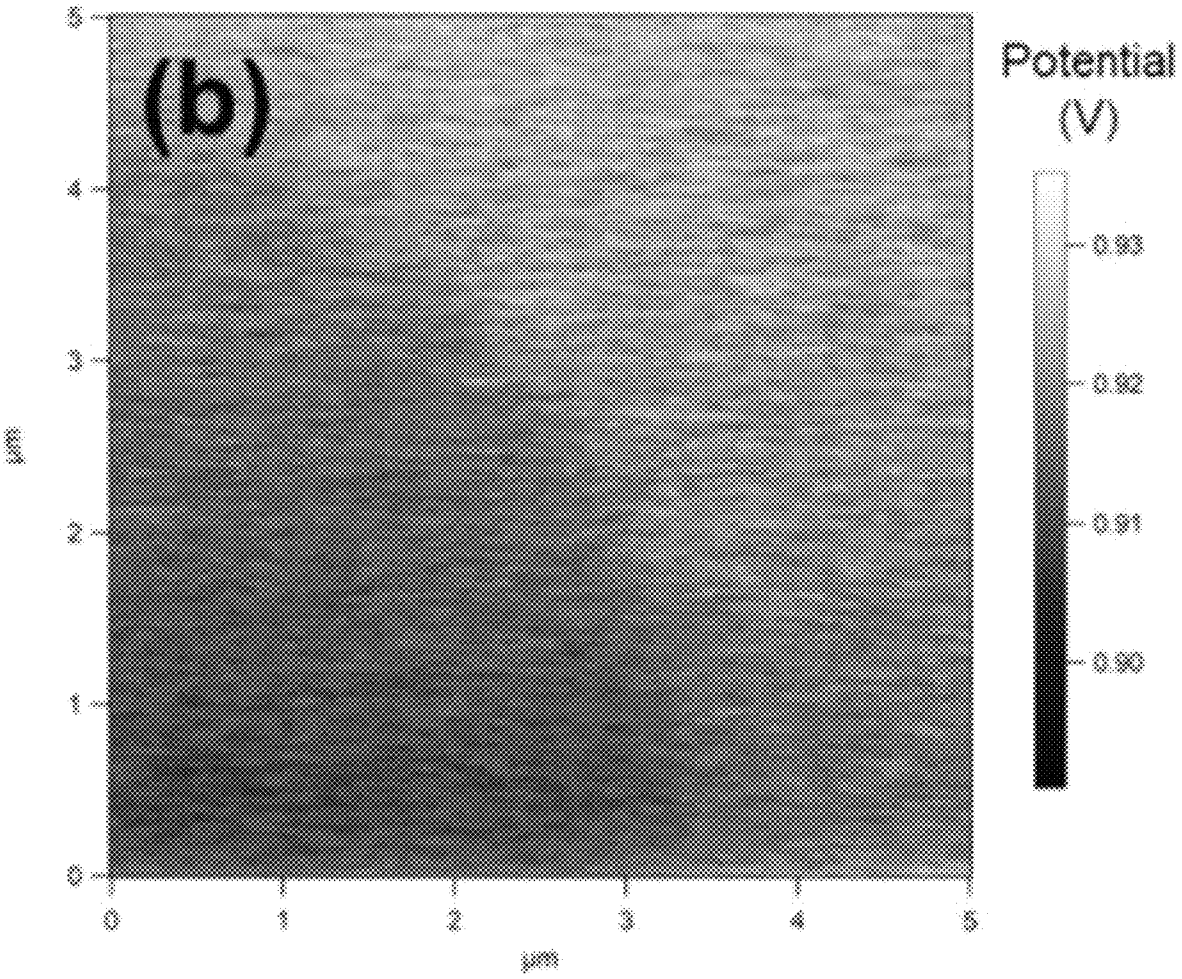
Figure 17:
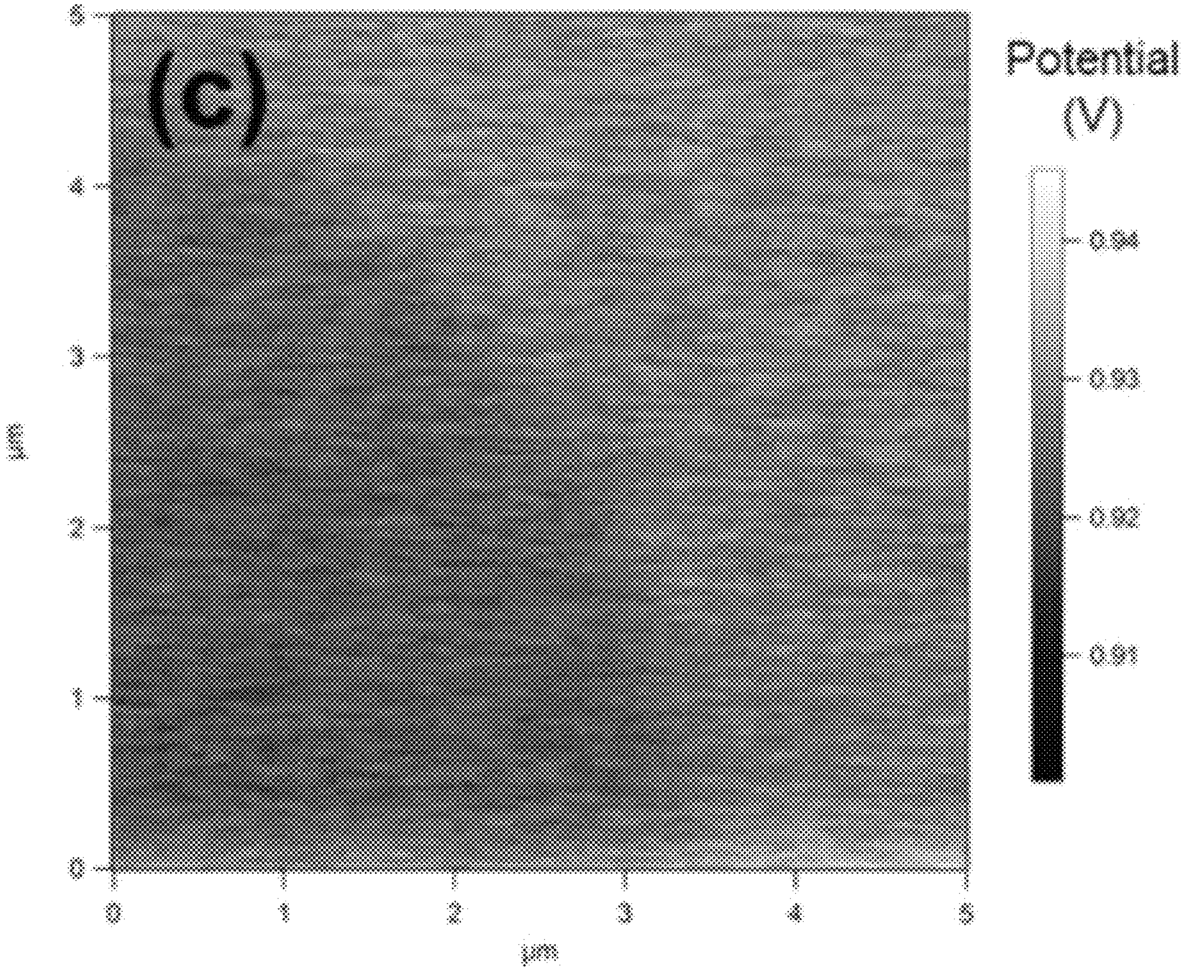

To further confirm the above mechanism, the water diffusion coupled with ions migration is visually proved by acid indicator (bromophenol blue/isopropanol solution). Bromophenol blue will change color from blue to yellow corresponding to the pH value changing with acid increasing. As shown in FIG. 4D, when water is added, the bromophenol blue close to the upper surface of the hydrogel membrane first becomes yellow, indicating the free protons being dissociated from the hydrogel. With further water diffusion, the coupled protons migrate from the top to bottom tube until the bromophenol blue/isopropanol solution becomes totally yellow (within 3 min). In clear contrast, there is little color change of bromophenol blue/isopropanol solution in the control sample PVA (FIG. 16) after 24 h moisturization, corresponding to a low current and voltage output. It well manifests the moisture induced mass ion diffusion is the key to the high electric generation of IHMEG. Furthermore, KPFM was applied to probe the potential change of the hydrogel with wetting for 15 and 30 min. The result shows that the side of hydrogel without wetting becomes more and more positive from ≈300 to ≈920 mV because of the water-induced proton diffusion (FIG. 4F). In contrast, the potential of wetted side remains almost the same (FIG. 17) with the time of water diffusion. Clearly, the water diffusion induced ions migration provokes the increase of potential. Combined with experimental observation and theoretical analysis, it is safe to believe that the directional movement of the protons coupled with fast moisture diffusion accelerates the high-power generation. Clearly, the synergistic effect of strong moisture-absorbing capability within hydrogel network, fast ionic clusters transfer of porous structures, as well as long-standing moisture gradient jointly empower the IHMEG stable power-output performance for a long time.

To achieve the large-scale integration is a pivotal step toward practical applications of IHMEGs. To this end, the circuits with the bottom electrodes were fabricated on a flexible substrate by a screen-printing method, the PVA-PA-glycerol hydrogel was dropped on the bottom electrodes, followed by placing top electrodes by the end-to-end connection to achieve large-scale series-connected devices. The sizes and numbers of the integrated IHMEG units can be designed according to application requirements of operating voltage and current.

Figure 5A:
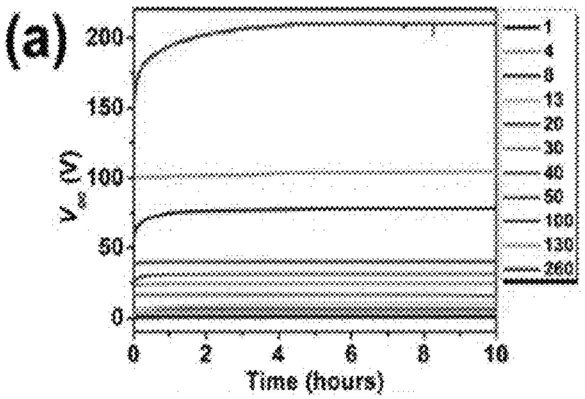
FIG. 5 depicts power devices by integration of IHMEG units in serial or parallel packages as a practical DC source for commercial low-power electronics. A) Voltage output of a serial IHMEG units with different series number. The test condition is 65% RH. B) The $V_{oc}$ related to the serial number of device units. Inset is the equivalent circuit scheme of serial IHMEG units. C) The picture of the voltage output of flexible IHMEG with 130 units in series. D) Current output of a single IHMEG package with different parallel number. E) The $I_{sc}$ related to the parallel number of device units. inset is the equivalent circuit of the parallel IHMEG package. F) Voltage-time curve of a commercial capacitor with 47 μF directly charged by a serial IHMEG units with 1, 4, and 8 units.
Figure 5B:
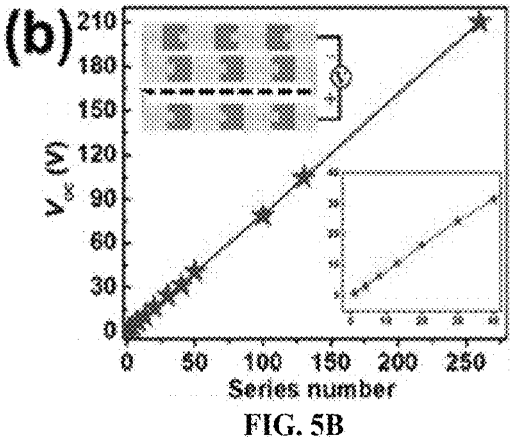
Figure 5C:
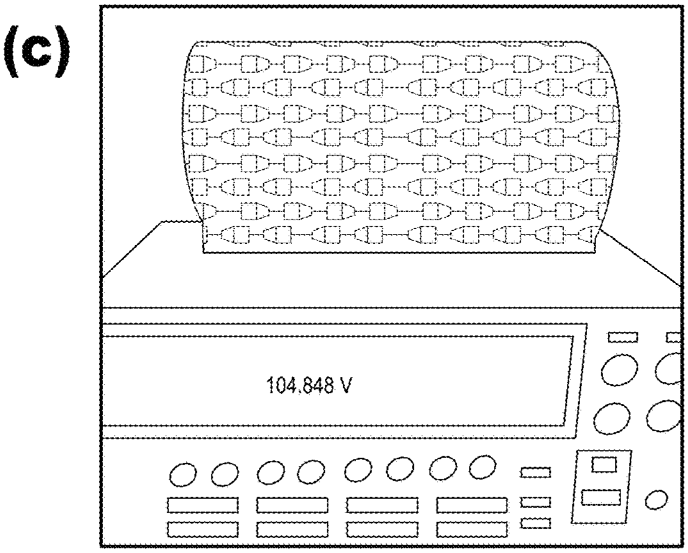
Figure 5D:
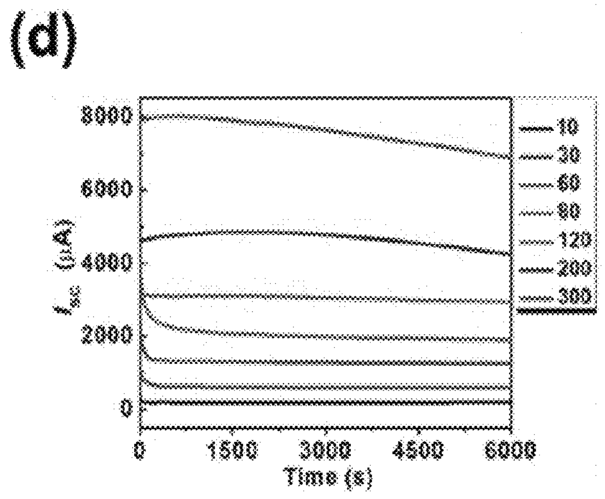
Figure 5E:
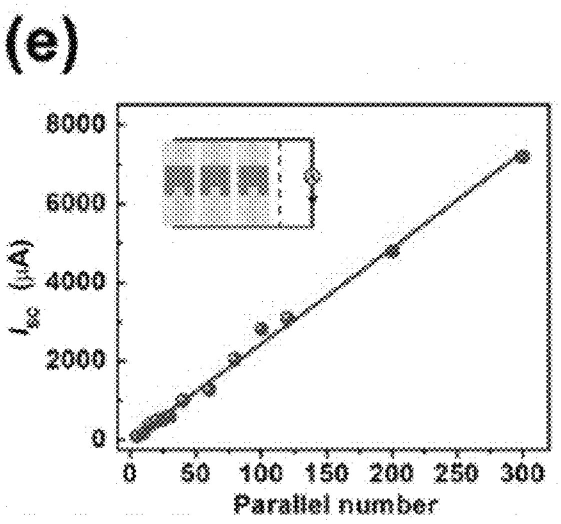
Figure 5F:
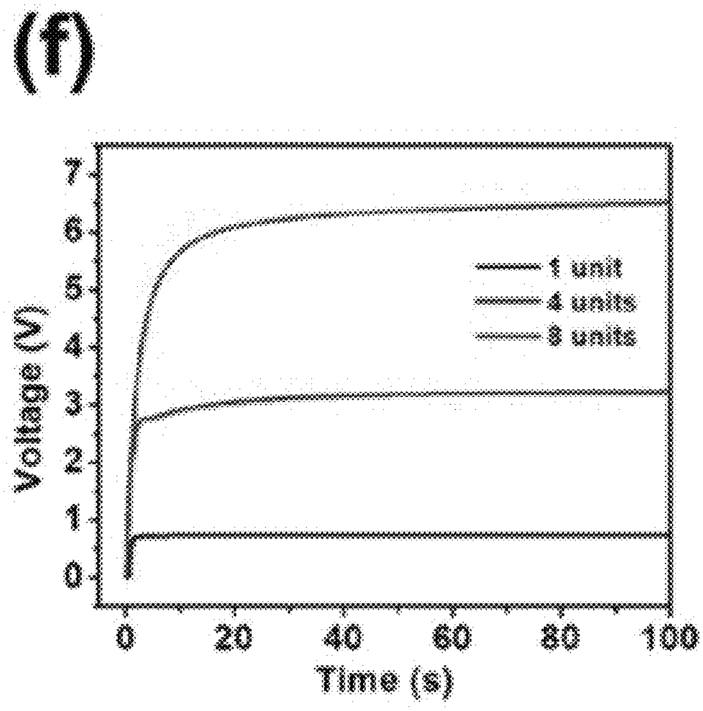
Figure 19:
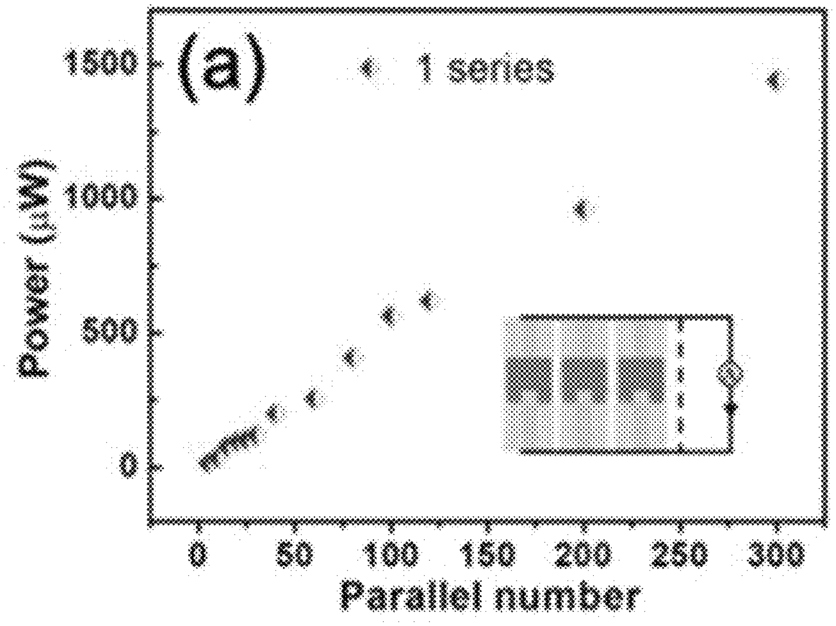
FIG. 19 depicts A) The power generated from the parallel-connected devices with single IHMEG units. Insert is the equivalent circuit of the parallel IHMEG arrays. The test condition is 65% RH. B) The power generated from the serial*parallel matrix devices with a fixed 5 IHMEG units in series and various number of connected IHMEG units in parallel. Insert is the equivalent circuit of the IHMEG matrix. The test condition is 40% RH. C) Voltage-time curves of commercial capacitors of varying capacitance charged by an integrated IHMEG device.
Figure 19:
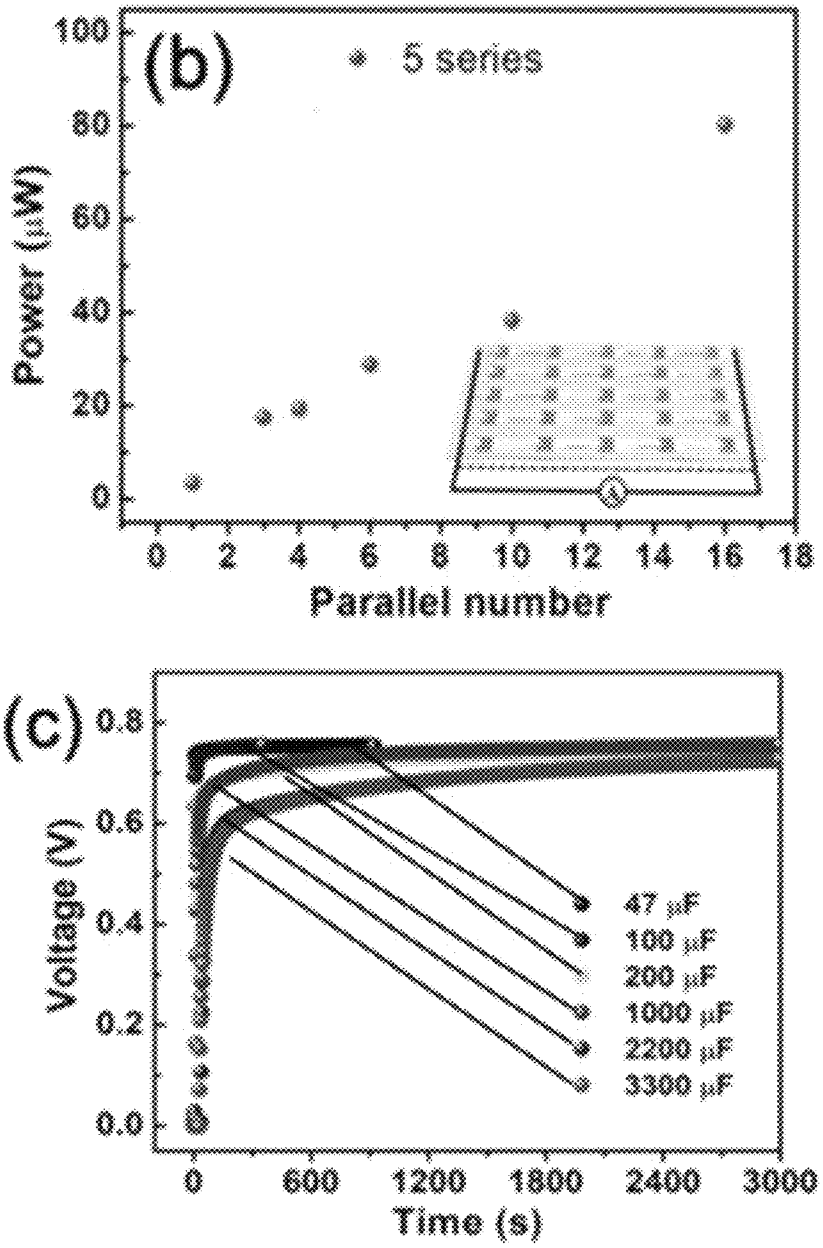

Such versatile, flexible, and light-weight power devices can be scaled up to satisfy practical applications. FIG. 5A illustrates the basically linear increment of the $V_{oc}$ of a serial connected device with the increasing number of IHMEGs. One single IHMEG offers an average voltage of 0.8 V and 100 units of IHMEGs generate a stable voltage of about 80 V. Furthermore, the 260 IHMEG units connected in series offer an $V_{oc}$ of about 210 V and stay stable continuously for more than 10 h. A linear relationship is well depicted in FIG. 5B, which demonstrates the excellent scaling performance of the IHMEGs. FIG. 5C shows that the flexible IHMEG with 130 units in series can generate about a high voltage of ≈105 V even at a bending state. More interestingly, the IHMEG devices are highly flexible and portable. And they also can be integrated on the flexible poly(ethylene terephthalate) film and clothing (FIG. 18), showing great potential for wearable electronic systems. The parallel integrated IHMEGs also show great linear scale-up performance. As depicted in FIG. 5D-E, the total short-circuit current of n-IHMEG connected in parallel follows a linear relationship of n $I_{sci}$ with a total voltage of 0.8 V. One single cell produces a continuous $I_{sc}$ of ≈25 μA at 65% RH. A parallelly connected device can reach about 7 mA with 300 IHMEGs at 6000 s. Estimating the power output, the power of parallel-connected IHMEG arrays shows good linear scale-up capability with parallel number and increases up to 1.5 mW for 1×300 parallel IHMEG arrays (FIG. 19). Furthermore, DC power source devices can be easily designed and fabricated by connecting IHMEG matrix in serial×parallel combinations for practical applications. Moreover, the electricity generated by IHMEGs can be quickly stored in commercial capacitors without the need of extra rectifiers. It is so easy to charge commercial capacitors with capacitance from 47 to 3300 μF in less than 10 min (FIG. 19C). Thus, with serial connections, a power device of multiple IHMEGs can be selected to charge a capacitor to required voltages (FIG. 5F) within 100 s directly.

Figure 6:
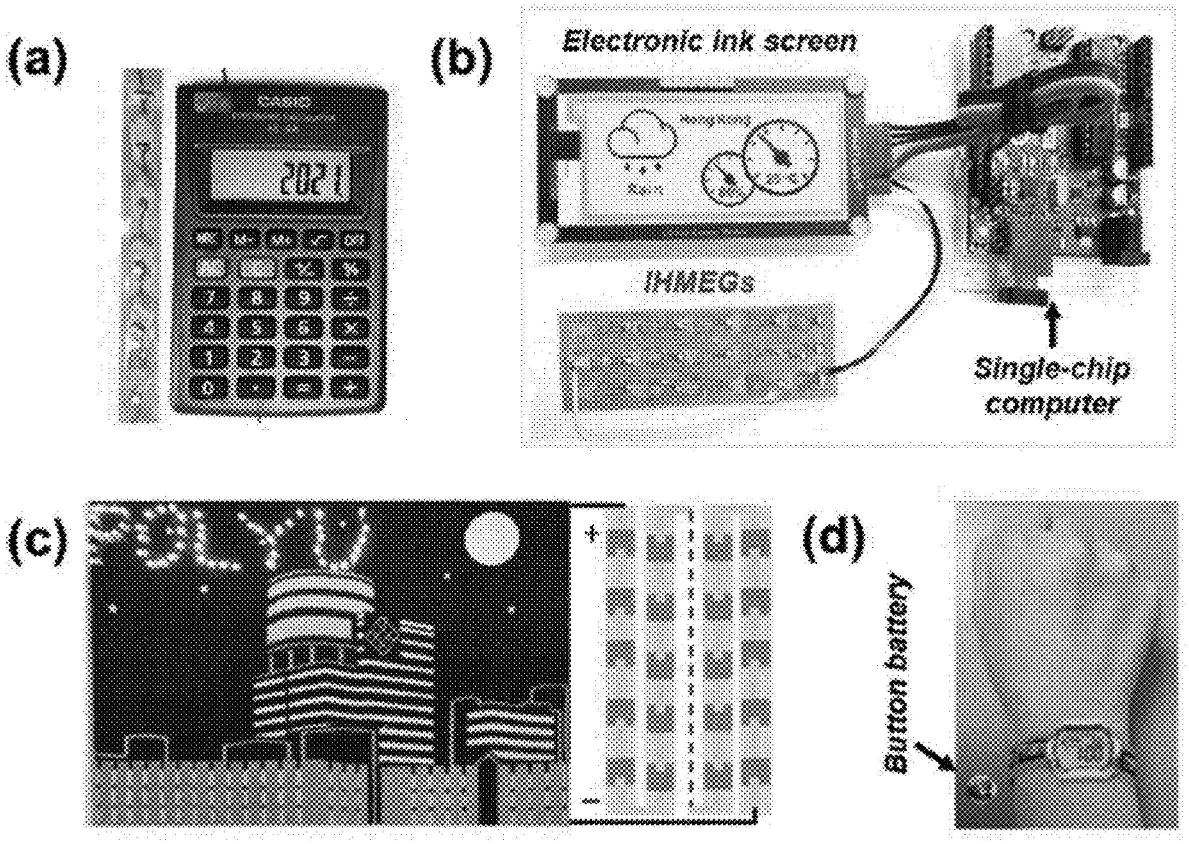
FIG. 6 depicts the applications of IHMEGs as a direct power source. A) Demonstration of 1×5 serial IHMEG package as a power-supplying source for directly driving an electronic calculator. B) Schematic of the circuit design and working demonstration of the self-powered electronic ink screen by IHMEG device with 3×5 series-parallel connection. The circuit primarily consists of three elements: electronic ink screen, electricity supply using the integrated IHMEG devices, and a single-chip computer to input the display message. C) The serial "POLYU" LEDs directly driven by integrated IHMEGs. D) Wearable demonstration of 1×5 serial IHMEG package as energy watchband to power an electronic watch, which normally uses button battery CR2032. E) Electro-deposition of Nickle millimeter-level structure by 5×5 IHMEGs device: i) Schematic plot of the setup for the Ni electroplating by using 5×5 IHMEGs. ii) SEM image and EDS mapping of the deposited nickel pattern. iii) The work voltage and current between the cathode and anode.
Figure 6:
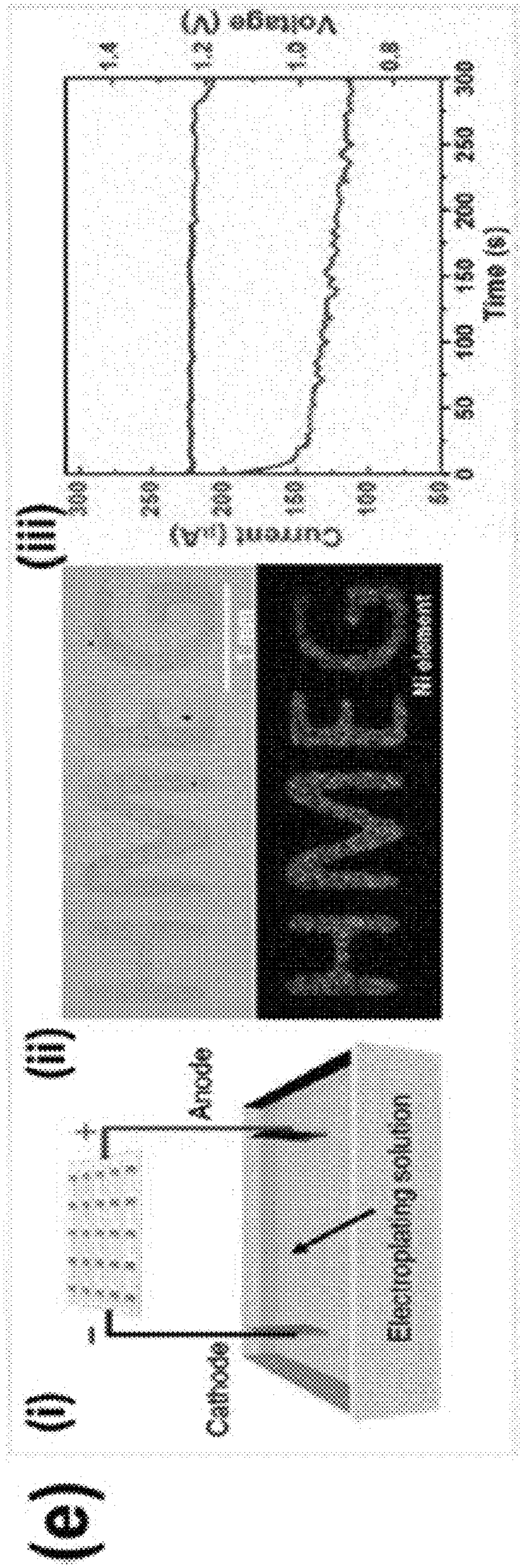

According to different application scenarios, the IHMEG units can be arbitrarily connected in serial or parallel or their combination as required, to drive many kinds of commercial electronics without any additional rectifying circuits and capacitors. For instance, as depicted in FIG. 6C, an electronic calculator can be easily powered by only 5 IHMEG units, and a IHMEG device with 3×5 series-parallel connection is even sufficient to directly power a dynamic electronic ink screen with a size of 9×4.6 $cm^2$ (FIG. 6A). Besides, as shown in FIG. 6B, by scalable connection of 260 units, 53 LEDs array can be continuously illuminated, well demonstrating the high electricity output of IHMEG to power different optoelectronics for daily use. More importantly, it is worth noting that the IHMEG is small-sized, lightweight, and flexible, making it especially suitable for wearable electronics. As an example, in FIG. 6D, a wearable self-powered watch, was designed and displayed by employing a five-IHMEG-serial package as the energy watchband. Compared with rigid button battery, the IHMEG watchband is highly flexible to be conformably bent around the wrist with little wearing discomfort, promising the potential application for self-powered wearable electronic system.

For further practical application, our IHMEG power device was successfully employed to electroplate metal nickel (Ni) structures on the millimeter scale. The detailed process is illustrated in FIG. 20. First, the photoresist was coated on the copper (Cu) plate as a mask layer, followed by the standard photolithograph to create the desired pattern on the photoresist. Then, Ni electroplating was implemented with the Cu plate as the cathode and Ni plate as the anode. The final step is to remove the photoresist. The 5×5 series parallel IHMEG device was integrated to directly power the electro-deposition process (FIG. 6E), The scanning electron microscope (SEM) image and Ni element mapping clearly show that the well-defined Ni pattern is successfully electroplated (FIG. 6E-ii; FIG. 20), The cross-sectional image reveals the formation of densely packed grain structure of the Ni layer with about 500 nm thickness (FIG. 20C). The work current and voltage between the two electrodes are about 130 μA and 1.2 V during 5 mins' electroplating (FIG. 6E-iii), showing a high working power output by a small packed IHMEG. Such flexible and easy-integrated IHMEGs are highly desirable and convenient in practical wearable applications.

Embodiments of the invention are described in detail below. Examples are shown in the attached drawings, where the same or similar labels throughout the embodiments denote the same or similar elements or elements having the same or similar functions. The embodiments described below by reference to the attached drawings are exemplary and are intended to explain the present invention and shall not be construed as limitations on the present invention.

The moisture power generation materials and device proposed according to the embodiment of the invention are described below with reference to the attached drawing. Firstly, the moisture power generation device proposed according to the embodiment of the invention is described.

During the study of embodiments described herein, it is found that when an asymmetrical humidity is constructed on both sides of the polymer film, oxygen-containing functional groups in the film will be hydrolyzed, thus releasing freely moving carriers. The uneven humidity inside the material results in the difference of carrier concentration. Under the action of diffusion, the carrier diffuses from the high concentration area to the low concentration area. If the external circuit is connected, the electrical energy will be output in the external circuit. This process is called moisture enabled power generation.

FIG. 20 is a schematic diagram of a moisture power generating device of an embodiment of the invention.

As shown in FIG. 20, the flexible moisture-enabled power generation device includes a thin film (10) comprising of a water-absorbing polymer, an acid or salt readily protonated/dissociated as well as an organic solvent with self-maintaining water feature. The thin film has the bottom and top surface. The device includes a first electrode (11) electrically connected to the bottom surface of the thin film mounted on the flexible substrate (12), and a second electrode (13) electrically connected to the top surface of the thin film. At least the top surface of the thin film is partially exposed to the ambient environment with relative humidity at lowest of 10%, and a spontaneous water-absorbing and proton dissociation/diffusion happen from top surface to the bottom surface. And then a potential difference and current generate between the two electrodes.

EXAMPLES

Materials

PVA (degree of hydrolysis: 99%, $M_n$: 100 000) was purchased from Chem Co., Ltd. PA (50 wt % in water) solution and glycerol (99%, extra pure) were offered by Acros Organics, Co., Ltd. The fibrous polyimide (FPI) membrane was kindly provided by Changchun Gao Qi polyimide material Co., Ltd, China. Conductive silver paste was supplied by Sigma Aldrich Co., Ltd. Bromophenol blue indicator 0.1% w/v in isopropyl alcohol was purchased from Aladdin Co., Ltd. All reagents were used without further treatment.

Preparation of IHMEG Units and Integrated Devices

First,10 g water and 8,7 g glycerol were uniformly mixed to prepare a binary solvent. Then 3 g PVA and 5 mL PA (24 wt %) were added into above solvent and dissolved at 95° C. for 2 h to achieve a homogeneous solution. The mixed solution was drop-casted onto the FPI membrane with screen-printed Ag electrodes and copper connections. The final thickness and size were regulated by dropped volume over the unit area. Typically, a 250 μL solution dropped onto 1 $cm^2$ area yielded an average film thickness of about 100 μm. A typical IHMEG device owns the area of 0.25 $cm_2$. Finally, a copper electrode was placed and adhered on the top of the hydrogel of the IHMEG. As the control devices, IHMEGs of pure PVA, and PVA-PA were prepared by the similar process. The films of PVA, PVA-PA, and PVA-PA-glycerol were drop-casted with500 μL volume or 200 μm thickness for FTIR, Raman, and KPFM tests.

Characterization and Measurement

I-V characteristics, $V_{oc}$, $I_{sc}$, and current with external loads were tested by Keithley 2400 (Tektronix, USA). The RH in the testing chamber was controlled by applying different saturated salt vapor, meanwhile with the RH monitored using a hygrometer (COS-03, Shandong Renke Control Technology Co., Ltd., China). An environmental chamber was employed to regulate the temperature from −24 to 60° C. meantime with the RH kept at 80%. All other RH tests were carried out at room temperature unless otherwise stated. For bending tests, the samples had a device size of 0.25 $cm^2$ with the gauge length of 50 mm. Cyclic bending test and compression test were implemented by Instron 5566, with Keithley 2400 recording the voltage change simultaneously at 70% RH. For compression test, the samples with a device size of 0.25 $cm^2$ was compressed by Instron 5566 under a compression load of 3 N.

The chemical structures of samples were characterized by FTIR spectroscopy (Spectrum 100, PerkinElmer, USA) in attenuated total-reflection (ATR) model, with the scanning range of 650-4000 $cm^{-1}$ and resolution of 4 $cm^{-1}$ over 16 scans. To in situ track the water diffusion process, the samples were vacuumed and dried for 2 days first and then scanned by ATR-FTIR every 5 min once they were exposed in the air under 65% RH. For further in-depth analysis of water diffusion process at the molecular level, 2D correlation ATR-FTIR spectra were processed and drawn by 2DCS software, developed by Zhou. The linear baseline corrections were processed in the regions of 3700-3000 $cm^{-1}$ first. In 2D correlation FTIR spectra, blue and pink cross peaks in the contour maps denote negative and positive correlation peaks, respectively. Raman spectra were obtained by Renishaw Micro-Raman Spectroscopy System using a green LED laser (532 nm). Similarly, the samples were vacuumed and dried for 2 days first and then scanned every 10 min once they were exposed in the air under 65% RH. KPFM was conducted on a Scanning Probe Microscope (Asylum MFP-3D Infinity). SEM (VEGA3 TESCAN, Czech) and energy dispersive X-ray spectroscopy (EDS) were employed to study the deposited "IHMEG" pattern and element analysis.

Statistical Analysis

The statistical analysis was conducted by using Excel 2013 software. The sample size (n) for each statistical analysis was given in each figure legend. Relevant data were raw and expressed as mean±standard deviation (SD).

Notwithstanding the embodiments of the invention shown and described herein, it is understood that the said embodiments are exemplary in nature and shall not be construed as a limitation of the invention and may be varied, modified, replaced or modified within the scope of the invention by ordinary technicians in the field.

What is claimed is:

1. An ionic hydrogel moisture-electric generator (IHMEG) comprising:

a thin film comprising a first surface and a second surface opposite to the first surface;

a first external electrode electrically connected to the first surface of the thin film;

a second electrode electrically connected to the second surface of the thin film; and a moisture impermeable barrier film disposed on the second surface of the thin film, wherein the thin film comprises a hydrogel comprising at least one hydrophilic polymer, an ionic species, and a solvent;

the ionic species is phytic acid; and the solvent comprises a hygroscopic liquid.

2. The IHMEG of claim 1, wherein the first surface of the thin film is at least partially exposed to an ambient environment with relative humidity of at least 10%.

3. The IHMEG of claim 1, wherein the at least one hydrophilic polymer is selected from the group consisting of polyvinyl alcohol, polyacrylic acid, sodium polyacrylic acid, sodium alginate, calcium alginate, polyacrylamide, cross-linked carboxymethyl cellulose, cross-linked poly(ethylene oxide), starch graft polyacrylonitrile copolymer, poly(3,4-ethylenedioxythiophene)-poly(styrenesulfonate) (PEDOT:PSS), polydiallyl dimethylammonium chloride, copolymers and a combination thereof.

4. The IHMEG of claim 1, wherein the at least one hydrophilic polymer is polyvinyl alcohol.

5. The IHMEG of claim 1, wherein the hygroscopic liquid is ethylene glycol, diethylene glycol, 2-(2-ethoxyethoxy)ethanol, a polyol, glycerol, propylene glycol, dipropylene glycol, 1,2-butanediol, 1,3-butanediol, 1,4-butanediol, sorbitol, polyethylene glycol, polypropylene glycol, or a combination thereof.

6. The IHMEG of claim 1, wherein the solvent further comprises water and the weight ratio of the hygroscopic liquid to water is 1:9 to 9:1, respectively.

7. The IHMEG of claim 6, wherein the hygroscopic liquid is glycerol.

8. The IHMEG of claim 1, wherein the moisture impermeable barrier film comprises a polyester, a polyimide, polyvinyl film, polypropylene, polytetrafluoroethylene, polytetrafluoroethylene, polyvinylidene fluoride, polyacrylonitrile, or a copolymer or mixture thereof.

9. The IHMEG of claim 1, wherein each of the first electrode and second electrode independently comprise one or more of gold, platinum, aluminum copper, nickel, silver, titanium, or carbon.

10. The IHMEG of claim 1, wherein the IHMEG comprises: wherein the at least one hydrophilic polymer is selected from the group consisting of polyvinyl alcohol, polyacrylic acid, sodium polyacrylic acid, sodium alginate, polyacrylamide, cross-linked carboxymethyl cellulose, cross-linked poly(ethylene oxide), starch graft polyacrylonitrile copolymer, and copolymers thereof; the solvent further comprises water and a hygroscopic liquid, wherein the hygroscopic liquid is ethylene glycol, diethylene glycol, 2-(2-ethoxyethoxy)ethanol, a polyol, glycerol, propylene glycol, dipropylene glycol, 1,2-butanediol, 1,3-butanediol, 1,4-butanediol, sorbitol, polyethylene glycol, polypropylene glycol, or a combination thereof.

11. The IHMEG of claim 1, wherein the at least one hydrophilic polymer is polyvinyl alcohol; the hygroscopic liquid is glycerol; and the solvent further comprises water.

12. The IHMEG of claim 11, wherein glycerol and water are present in the solvent at a ratio of 1:9 to 9:1, respectively.

13. The IHMEG of claim 11, wherein phytic acid is present in the hydrogel at a concentration of 12-48 wt % relative to the combined weight of the ionic species, the at least one hydrophilic polymer and the solvent.

14. The IHMEG of claim 11, wherein the thin film has a desired thickness in the range of 0.1-2.5 mm.

15. The IHMEG of claim 1, wherein the IHMEG has an open-circuit voltage of 0.22-0.88 V, a short-circuit current of 82 nA-64 μA in a range of 10%-85% relative humidity, respectively and the IHMEG continuously works in Direct-Current mode for over 1,000 hours in open environment.

16. A method of generating electrical power, the method comprises at least partially exposing the first surface of the IHMEG of claim 1 to an ambient environment having relative humidity of at least 10% thereby forming a moisture gradient in the thin film and generating electrical power in the IHMEG.

17. The method of claim 16, wherein the ambient environment has a temperature between −24-60° C.

18. A plurality of IHMEG of claim 1, wherein each IHMEG of the plurality of IHMEG is independently electrically connected in parallel or in series.

* * * * *